United States Patent
Gutfinger et al.

(10) Patent No.: US 10,185,857 B2
(45) Date of Patent: Jan. 22, 2019

(54) DEVICES, SYSTEMS, AND METHODS FOR READING BARCODES

(71) Applicants: Canon Information and Imaging Solutions, Inc., Melville, NY (US); Canon U.S.A., Inc., Melville, NY (US)

(72) Inventors: Ron S. Gutfinger, Tustin, CA (US); Wei-Jhy Chern, Irvine, CA (US)

(73) Assignees: Canon Information and Imaging Solutions, Inc., Melville, NY (US); Canon U.S.A., Inc., Melville, NY (US)

( * ) Notice: Subject to any disclaimer, the term of this patent is extended or adjusted under 35 U.S.C. 154(b) by 0 days.

(21) Appl. No.: 15/643,234

(22) Filed: Jul. 6, 2017

(65) Prior Publication Data

US 2018/0365462 A1   Dec. 20, 2018

Related U.S. Application Data

(60) Provisional application No. 62/519,645, filed on Jun. 14, 2017.

(51) Int. Cl.
   *G06K 7/10* (2006.01)
   *G06K 7/14* (2006.01)
   *G06T 7/11* (2017.01)

(52) U.S. Cl.
   CPC ....... *G06K 7/1413* (2013.01); *G06K 7/10722* (2013.01); *G06T 7/11* (2017.01); *G06T 2207/10016* (2013.01)

(58) Field of Classification Search
   CPC .................................................. G06K 7/1413
   USPC ............ 235/462.41, 462.08, 462.2, 454, 385
   See application file for complete search history.

(56) References Cited

U.S. PATENT DOCUMENTS

| | | | |
|---|---|---|---|
| 6,739,513 B1 | 5/2004 | McClellan | |
| 7,108,187 B2 | 9/2006 | Turvy | |
| 8,139,117 B2 | 3/2012 | Dwinell | |
| 8,439,260 B2 | 5/2013 | Shi | |
| 8,736,615 B2 | 5/2014 | Slavin | |
| 8,867,857 B2 | 10/2014 | Santos | |
| 8,939,369 B2 | 1/2015 | Olmstead | |
| 2008/0073434 A1* | 3/2008 | Epshteyn | G06K 7/10 235/454 |
| 2009/0121017 A1* | 5/2009 | Cato | G06Q 10/087 235/385 |
| 2013/0048739 A1 | 2/2013 | West | |
| 2013/0278761 A1 | 10/2013 | Wu | |
| 2015/0169829 A1* | 6/2015 | Jaynes | G06K 9/18 705/3 |

(Continued)

FOREIGN PATENT DOCUMENTS

| | | |
|---|---|---|
| JP | 2008-140033 | 6/2008 |
| WO | 2012014972 | 2/2012 |

OTHER PUBLICATIONS

Matrox Imaging Library (MIL), Release 8.0 with Processing Pack 4, Aug. 2007.

(Continued)

*Primary Examiner* — Allyson Trail
(74) *Attorney, Agent, or Firm* — Canon U.S.A., Inc. IP Division

(57) ABSTRACT

Devices, systems, and methods obtain a sequence of images, track a label-candidate area in the sequence of images, and read a value of a barcode of interest in the label-candidate area in an image in the sequence of images.

19 Claims, 18 Drawing Sheets

(56) References Cited

U.S. PATENT DOCUMENTS

| | | | |
|---|---|---|---|
| 2015/0241457 A1* | 8/2015 | Miller | G01N 35/00732 |
| | | | 348/143 |
| 2016/0104021 A1* | 4/2016 | Negro | G06K 7/1443 |
| | | | 235/462.08 |
| 2016/0154987 A1 | 6/2016 | Creusot | |
| 2016/0225135 A1 | 8/2016 | Young | |
| 2018/0032832 A1* | 2/2018 | Shen | G06K 9/3208 |

OTHER PUBLICATIONS

Microscan, X-Mode Barcode Reading: It Just Works, May 8, 2015.
Vitronic, Vipac Software Solutions, Dec. 2016.

* cited by examiner

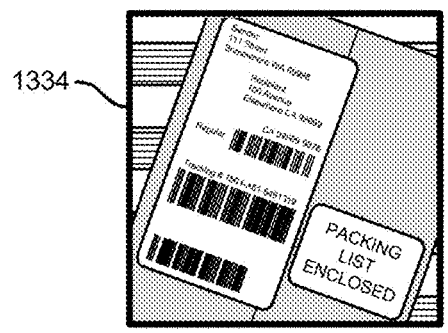
FIG. 13A
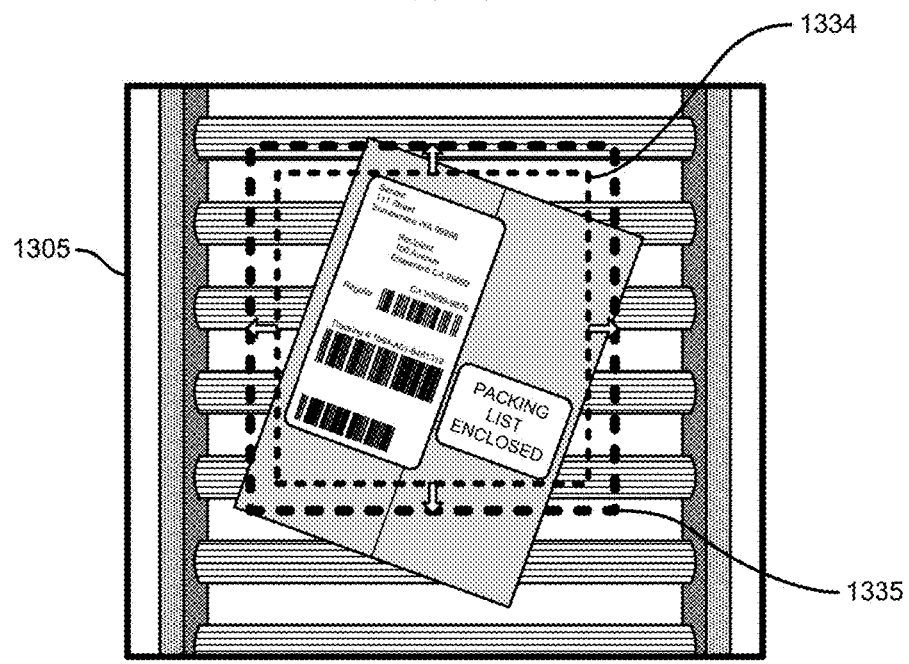
FIG. 13B
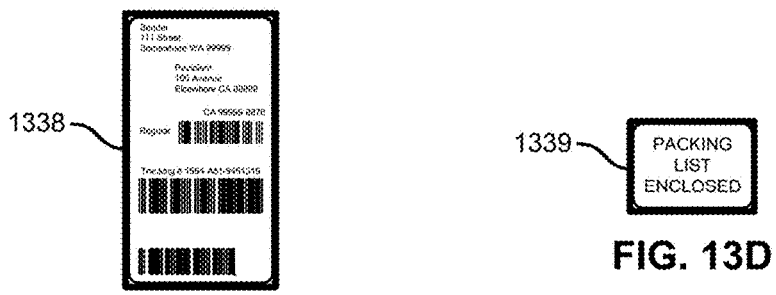
FIG. 13C
FIG. 13D

US 10,185,857 B2

DEVICES, SYSTEMS, AND METHODS FOR READING BARCODES

CROSS-REFERENCE TO RELATED APPLICATIONS

This application claims the benefit of U.S. Application No. 62/519,645, which was filed on Jun. 14, 2017.

BACKGROUND

Technical Field

This description generally relates to automated systems for reading barcodes.

Background

Shipping labels that are attached to packages usually include barcodes. These barcodes can be used to sort the packages. Some systems that use barcodes to sort packages can sort thousands of packages per hour.

SUMMARY

Some embodiments of a device comprise one or more computer-readable media and one or more processors that are coupled to the one or more computer-readable media. The one or more processors are configured to cause the device to obtain an image, which includes a plurality of pixels; identify a label-candidate area in the image, wherein the label-candidate area is smaller than the image; determine if the label-candidate area satisfies a condition; in response to determining that the label-candidate area does not satisfy the condition, inflate the label-candidate area, thereby generating an inflated label-candidate area; obtain a higher-resolution version of the image; identify the inflated label-candidate area in the higher-resolution version of the image; and determine if the inflated label-candidate area in the higher-resolution version of the image satisfies the condition.

Some embodiments of one or more computer-readable storage media store instructions that, when executed by one or more computing devices, cause the one or more computing devices to perform operations that comprise obtaining a sequence of images, tracking a label-candidate area in the sequence of images, and reading a value of a barcode of interest in the label-candidate area in an image in the sequence of images.

Some embodiments of a method comprise obtaining two or more images, wherein each of the two or more images includes a plurality of pixels; identifying a respective label-candidate areas in each of the two or more images, thereby identifying two or more label-candidate areas; determining that two of the label-candidate areas both depict a label on a package, wherein the label includes at least one barcode; reading the barcode in one of the label-candidate areas; and discarding another one of the label-candidate areas without reading the barcode in the other one of the label candidate areas.

BRIEF DESCRIPTION OF THE DRAWINGS

FIG. 13A illustrates an example embodiment of an SLCA.

FIG. 13B illustrates and example embodiment of an inflated SLCA.

FIGS. 13C and 13D illustrate example embodiments of SLCAs that were extracted from an inflated SLCA.

DESCRIPTION

The following paragraphs describe explanatory embodiments. Other embodiments may include alternatives, equivalents, and modifications. Additionally, the explanatory embodiments may include several novel features, and a particular feature may not be essential to some embodiments of the devices, systems, and methods that are described herein.

Figure 1:
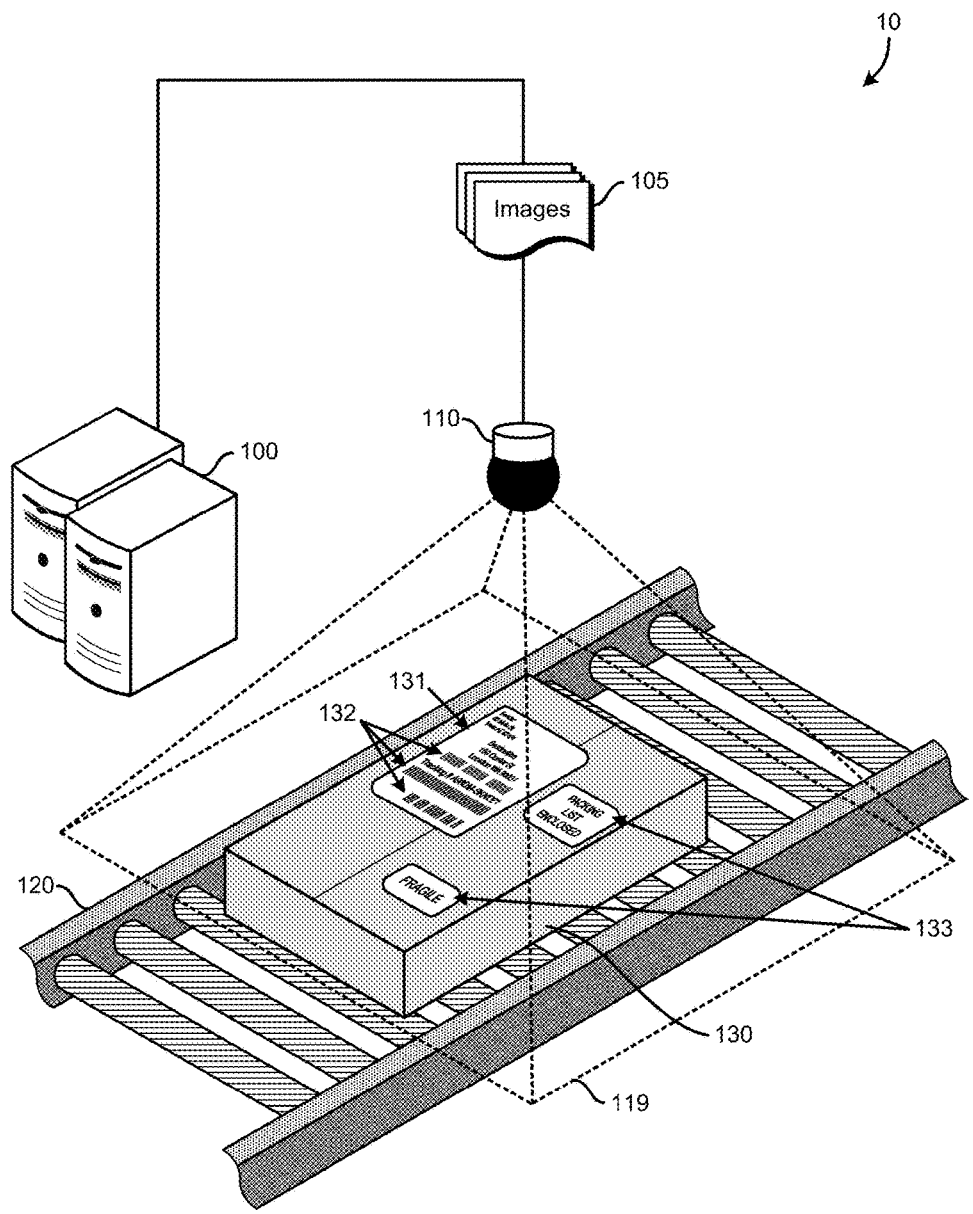
FIG. 1 illustrates an example embodiment of a system for reading barcodes.

FIG. 1 illustrates an example embodiment of a system 10 for reading barcodes. The system includes one or more barcode-reading devices 100, one or more image-capturing devices 110, and a conveyor system 120. The one or more barcode-reading devices 100 are specially-configured computing devices.

The conveyor system 120 carries packages, such as the package 130 that is shown in FIG. 1, from one location to another. In this embodiment, the conveyor system 120 is a roller conveyor system, although some embodiments of the system 10 use another type of conveyor system (e.g., a conveyor belt). Also, a shipping label 131, which includes three barcodes 132, and two other labels 133 are affixed to the package 130. Although the barcodes 132 are one-dimensional barcodes, some embodiments use two-dimensional barcodes (e.g., matrix barcodes).

The one or more image-capturing devices 110 capture images of the conveyor system 120 and the packages that it carries, for example the package 130 in FIG. 1. An image-capturing device 110 can captures images 105 of a location on the conveyor system 120 that is within the field of view 119 of the image-capturing device 110. As a package 130 approaches this location, the package 130 enters the field of view 119 of the image-capturing device 110 and is also captured in the images 105.

The one or more barcode-reading devices 100 obtain the images 105 from the image-capturing device 110. Then the one or more barcode-reading devices 100 read the respective barcode of one or more of the barcodes 132 on the package 130 from the images 105 that depict the shipping label 131, thereby obtaining the respective values of any read barcodes 132. The one or more barcode-reading devices 100 can use the value of a read barcode to determine if the package 130 is being conveyed to the correct destination.

However, if many packages 130 are being rapidly carried by the conveyor system 120, if the image-capturing device 110 captures images rapidly (e.g., six frames per second, ten frames per second), or if the resolution of the images 105 is very high, then the system 10 may not have time to read every barcode 132 before the system 10 must determine if the package 130 is being correctly conveyed. For example, if the image-capturing device 110 captures ten frames per second, and the resolution of the images 105 is so high that the one or more barcode-reading devices 100 require one-fifth of a second to read the barcodes 132 in an image 105, then the system 10 will not have time to read every barcode 132 in every image 105.

Also, some of the images 105 may depict clipped views of the shipping label 131 (e.g., only one half of the shipping label 131), and the image quality in some images 105 may be poor because of bad lighting, glare, blurriness, or other reasons. Thus, capturing only one image 105 of a package's shipping label 131 may result in the one or more barcode-reading devices 100 not having an image 105 of adequate quality for barcode reading.

Furthermore, some embodiments of the system 10 do not need to read all of the barcodes 132 on a shipping label 131. For example, the system 10 may need to read only one or two barcodes 132 of interest on the shipping label 131 to determine if the package 130 is being conveyed to the correct destination.

Accordingly, some embodiments of the system 10 capture multiple images 105 of the shipping label 131 on a package 130, search the multiple images 105 for readable barcodes 132, and read the barcodes 132 only until all barcodes 132 of interest have been read. The other images 105 of the shipping label 131 are discarded.

Figure 2:
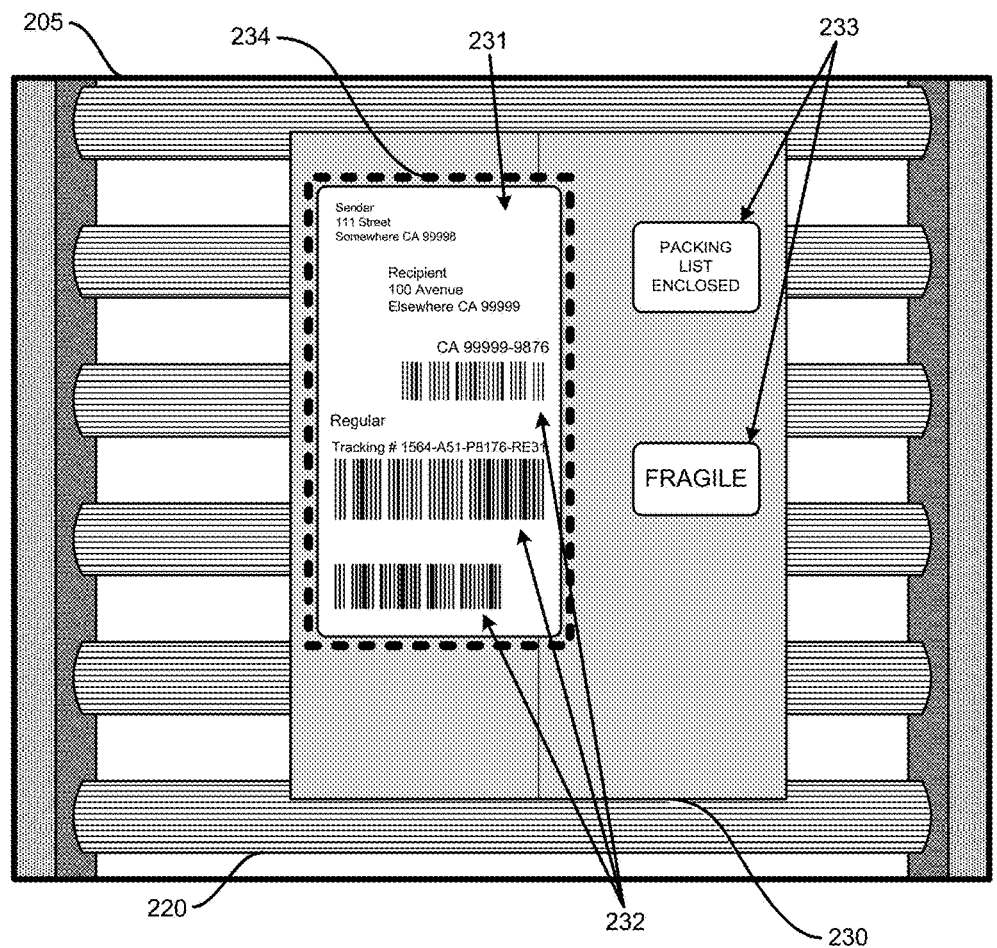
FIG. 2 illustrates an example embodiment of an image of a package.

FIG. 2 illustrates an example embodiment of an image of a package. The image 205 depicts the package 230 while the package 230 is carried by a conveyor system 220. The package 230 includes a shipping label 231 and other labels 233. The shipping label 231 includes three barcodes 232. FIG. 2 also illustrates a shipping-label-candidate area (SLCA) 234. An SLCA 234 is an area in the image 205 that one or more barcode-reading devices have identified as possibly including one or more barcodes. For example, some embodiments of a barcode-reading device identify an SLCA 234 based on the colors in the image 205, such as by identifying a white area that is surrounded by a brown area: the white area may be an SLCA 234. For example, in some embodiments, the SLCA 234 includes the entire shipping label 231 and some of the surrounding package 230, the SLCA 234 includes the entire shipping label 231 and one of the surrounding package 230, or, alternatively, the SLCA 234 includes only part of the shipping label 231 and none of the surrounding package 230. In the embodiment that is shown in FIG. 2, the SLCA 234 includes the entire shipping label 231 and some of the surrounding package 230.

Figure 3:
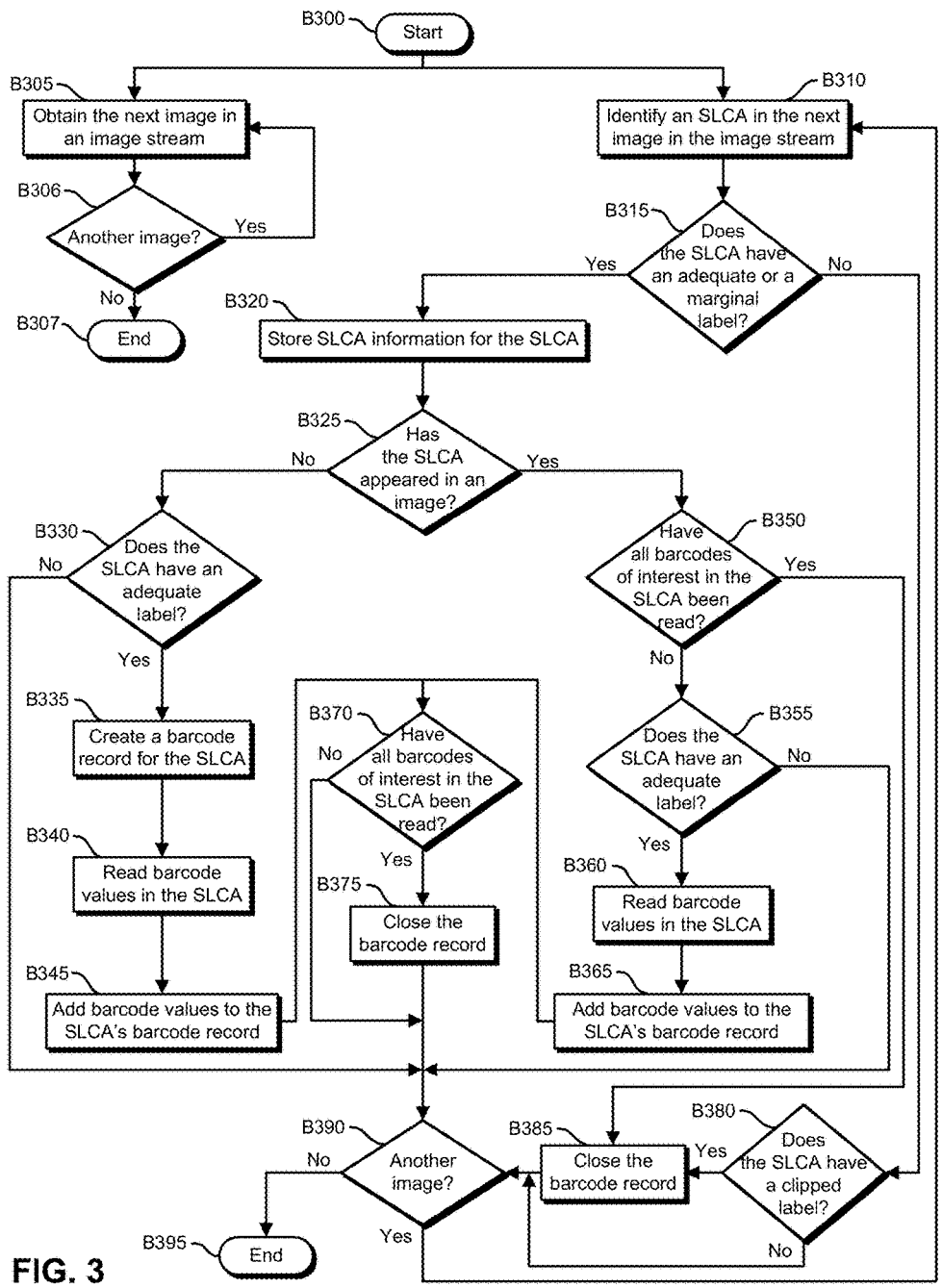
FIG. 3 illustrates an example embodiment of an operational flow for reading barcodes.

FIG. 3 illustrates an example embodiment of an operational flow for reading barcodes. Although this operational flow and the other operational flows that are described herein are each presented in a certain order, some embodiments of these operational flows may perform at least some of the operations in different orders than the presented orders. Examples of possible different orderings include concurrent, overlapping, reordered, simultaneous, incremental, and interleaved orderings. Thus, other embodiments of the operational flows that are described herein may omit blocks, add blocks, change the order of the blocks, combine blocks, or divide blocks into more blocks.

Furthermore, although this operational flow and the other operational flows that are described herein are performed by a barcode-reading device, other embodiments of these operational flows may be performed by two or more barcode-reading devices or by one or more other specially-configured computing devices.

The flow starts in block B300, and then branches into a first flow and a second flow. The first flow proceeds to block B305, where a barcode-reading device obtains the next image in an image stream from an image-capturing device (e.g., a camera). Next, in block B306, the barcode-reading device determines if the image-capturing device is sending another image. If yes (block B306=Yes), then the first flow returns to block B305. If not (block B306=No), then the first flow ends in block B307.

From block B300, the second flow moves to block B310. In block B310, the barcode-reading device identifies an SLCA in the next image in the image stream. Next, in block B315, the barcode-reading device determines if the SLCA has an adequate label or a marginal label, for example as described in FIG. 11. If the image does not (block B315=No), for example if the SLCA is clipped, then the second flow proceeds to block B380. If the SLCA does include an adequate label or a marginal label (block B315=Yes), then the second flow moves to block B320.

In block B320, the barcode-reading device stores SLCA information for the SLCA. The SLCA information may describe one or more of the shape of the SLCA, the size of the SLCA, and the location (e.g., x-y coordinates) of the SLCA in the image. Next, in block B325, the barcode-reading device determines if the SLCA has already appeared in an image, for example as described in FIG. 15. Some embodiments of the barcode-reading device determine that the SLCA has already appeared in an image if an SLCA of approximately the same size, shape, and orientation appeared in a previous image, such as a previous image in a selected range of images (e.g., the previous three images, the previous five images, the previous images that were received after the image that included the most-recently-detected clipped SLCA). If the barcode-reading device determines that the SLCA is has not already appeared in an image (block B325=No), then the second flow moves to block B330. Otherwise (block B325=Yes) the second flow moves to block B350.

In block B330, the barcode-reading device determines if the SLCA has an adequate label. The barcode-reading device may use the results from block B315. If the SLCA has an adequate label (block B330=Yes), then the second flow proceeds to block B335. Otherwise (block B330=No) the second flow moves to block B390.

In block B335, the barcode-reading device creates a barcode record (e.g., an object, an entry in a table, an entry in a database, a file) for the SLCA. A barcode record stores barcode information (e.g., one or more barcode values) that has been read from a respective SLCA. In some embodiments, in block B335 the barcode-reading device starts a respective harvester for the SLCA. A harvester is a code library that accepts an SLCA as an input and outputs the respective values of all the barcodes it can identify in the SLCA. From block B335, the second flow moves to block B340, where the barcode-reading device (e.g., a harvester that is implemented by the barcode-reading device) reads one or more barcode values of the barcodes in the SLCA. In some embodiments, the barcode-reading device uses a library that implements a function that receives an SLCA as an input, that attempts to read all of the barcode values in the SLCA, and that returns all read barcode values. If the SLCA does not include any readable barcodes, for example because the SLCA has no barcodes or none of the barcodes is readable, then the measurement device may attempt to read barcodes even if it cannot actually read the barcode values.

Next, in block B345, the barcode-reading device adds any read barcode values to the SLCA's barcode record. After block B345, the second flow proceeds to block B370.

If the second flow moves from block B325 to block B350, then in block B350 the barcode-reading device determines if all the barcodes of interest in the SLCA have been read. For example, in some embodiments only a barcode that encodes a tracking number is a barcode of interest, and in some embodiments a barcode that encodes a tracking number and a barcode that encodes a ZIP code are each a barcode of interest. Also, an SLCA may not include a barcode, for example the SLCA 1339 in FIG. 13D, and therefore such an SLCA does not include a barcode of interest that has not been read. If all the barcodes of interest have not been read (block B350=No), then the second flow proceeds to block B355. Otherwise (block B350=Yes) the second flow moves to block B380. In block B355, the barcode-reading device determines if the SLCA includes an adequate label. The barcode-reading device may use the results from block B315. If yes (block B355=Yes), then the second flow moves to block B360. If not (block B355=No), then the second flow proceeds to block B390. In block B360, the barcode-reading device reads one or more barcode values in the SLCA, for example using the respective harvester of the SLCA. Then in block B365, the barcode-reading device adds the read barcode values to the SLCA's barcode record. In block B365, the barcode-reading device may also remove duplicate barcode values from the barcode record. The second flow then moves to block B370.

In block B370, the barcode-reading device determines if all barcodes of interest in the SLCA have been read. If yes (block B370=Yes), then the second flow moves to block B375. Otherwise (block B370=No) the second flow moves to block B390. In block B375, the barcode-reading device closes the SLCA's barcode record, which indicates that the values of all barcodes of interest in the SLCA have been obtained. Also, a closed barcode record is a barcode record to which the barcode-reading device no longer adds barcode values. And in embodiments that use a harvester, the barcode-reading device stops the SLCA's harvester. Furthermore, the barcode-reading device may also use the value of any barcodes of interest to make a decision about the barcode's package. For example, the barcode-reading device may determine if the package is on the correct conveyor system or if the package needs to be routed to a particular destination. The second flow then advances to block B390.

Figure 11:
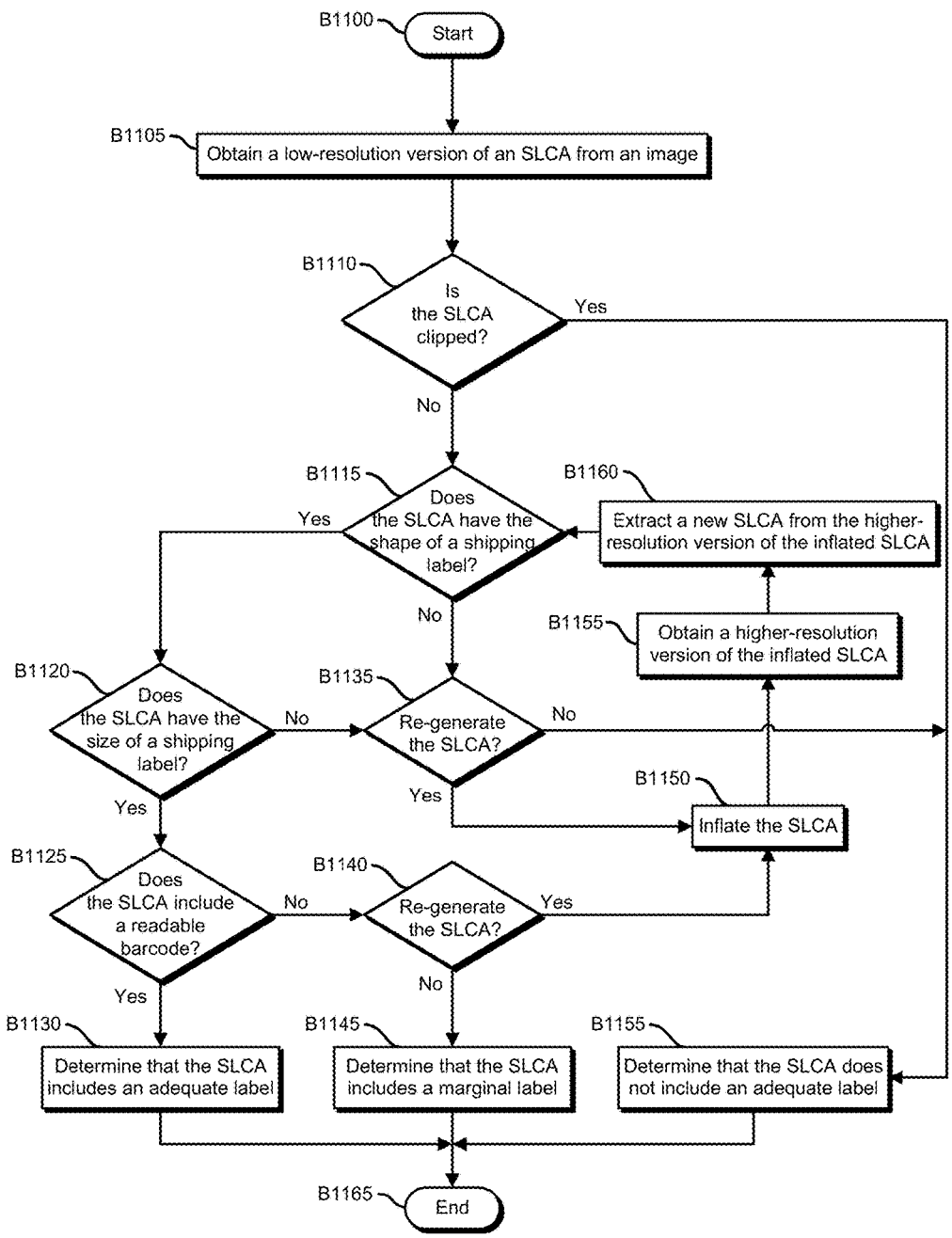
FIG. 11 illustrates an operational flow for determining if a shipping-label-candidate area (SLCA) includes an adequate label (e.g., shipping label).

If the second flow proceeds to block B380, then the barcode-reading device determines if the SLCA includes a clipped label (for example as described in block B1110 in FIG. 11). If not (block B380=No), then the second flow moves to block B390. If the SLCA does include a clipped label (block B380=Yes), then the second flow moves to block B385. In block B385, the barcode-reading device closes the barcode record of the last SLCA that had an adequate label or a marginal label. Also, in embodiments that use a harvester, the barcode-reading device stops any active harvesters. The second flow then proceeds to block B390.

In block B390, the barcode-reading device determines if it has received another image in the image stream. If yes (block B390=Yes), then the second flow returns to block B310. If not (block B390=No), then the second flow ends in block B395.

Also for example, some embodiments perform blocks B315-B385 in parallel for multiple SLCAs, each of which was extracted from a different image of the same label. Once the values of all barcodes of interest have been extracted from an SLCA that includes the label, then the performance of blocks B315-B385 for the other SLCAs that include the label can be stopped.

Figure 4:
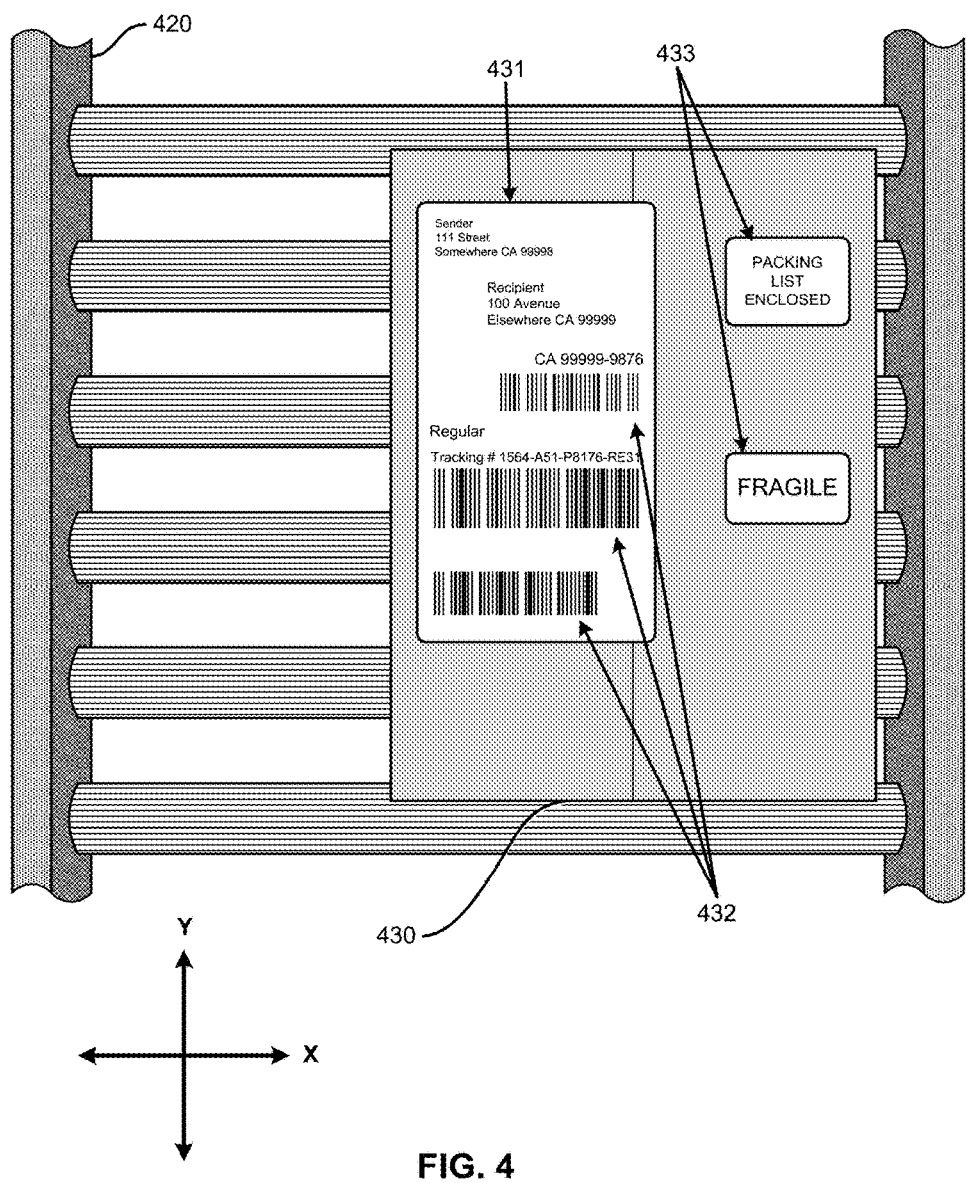
FIG. 4 illustrates an example embodiment of a package on a conveyor system.

FIG. 4 illustrates an example embodiment of a package on a conveyor system. The package 430 includes a shipping label 431 and other labels 433. The shipping label 431 includes three barcodes 432. The conveyor system 420 moves the package 430 along the y-axis. Some embodiments of the conveyor system 420 move the package 430 only a little, if at all, along the x-axis. In this embodiment, two edges of the package 430 are parallel to, or nearly parallel to, the y-axis, and the other two edges of the package 430 are parallel to, or nearly parallel to, the x-axis.

Figure 5A:
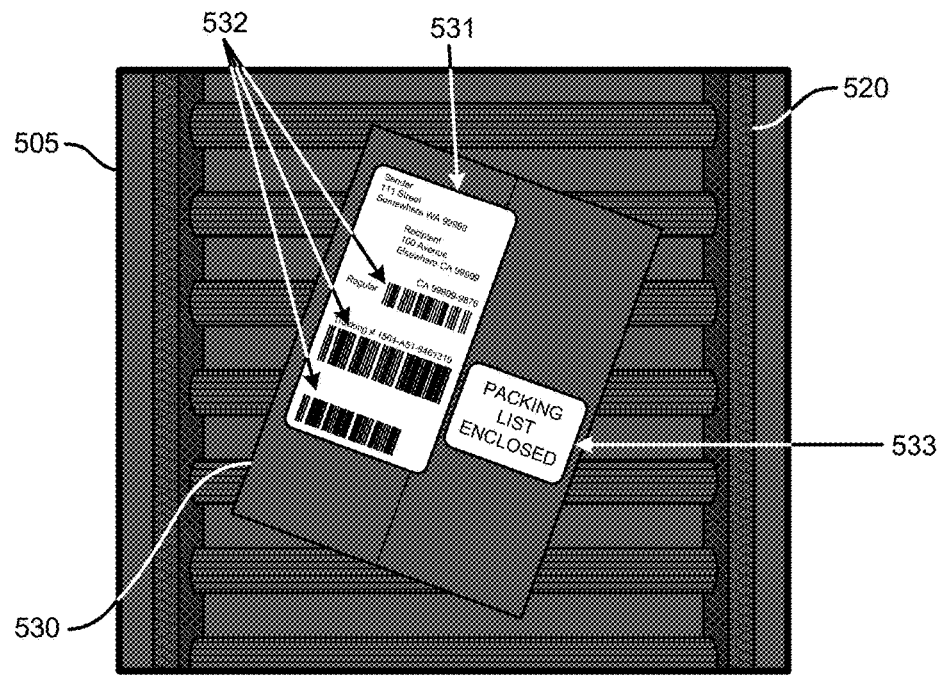
FIGS. 5A and 5B illustrate example embodiments of images of a package on a conveyor system.
Figure 5B:
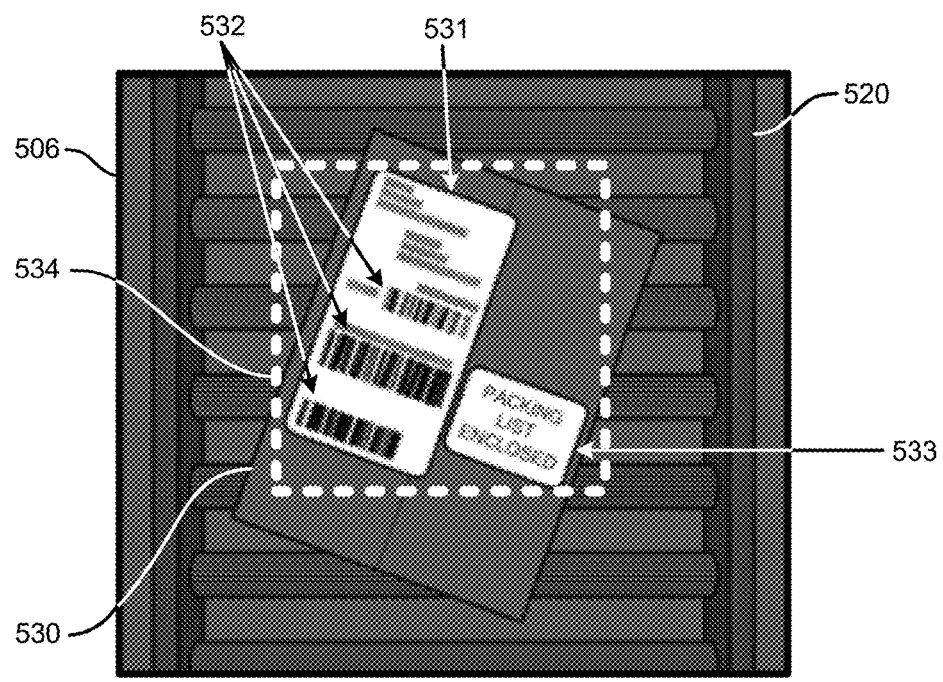

FIGS. 5A and 5B illustrate example embodiments of images of a package on a conveyor system. FIG. 5A shows a grayscale image 505 of a package 530 on a conveyor system 520. To identify an SLCA, some embodiments of a barcode-reading device generate a grayscale version of the image (a grayscale image), an example of which is the grayscale image 505 in FIG. 5A. In the grayscale image 505, the white shipping label 531 and another white label 533 stand out from the darker colors in the rest of the grayscale image 505. And the barcodes 532 stand out from the shipping label 531. The contrast between the shipping label 531 and the darker colors in the grayscale image 505 can be used to identify an SLCA. Also, the grayscale image 505 may be described in fewer bits than the original image (e.g., a grayscale-image file may be smaller than a color-image file).

Additionally, if the image that is being used to identify the SLCA (e.g., an original image, a grayscale image, a resized grayscale image) is too dark, the barcode-reading device may normalize the image that is being used to identify the SLCA, for example using adaptive histogram equalization. In some embodiments, the barcode-reading device determines the darkness or light level of the image that is being used to identify the SLCA by pixel mean value, and if pixel mean value <80, then pixel value=0-255/black-white. The darkness or light level can then be used to normalize the image.

Also, some embodiments of the barcode-reading device determine a bi-tonal threshold that is used to generate a binary or bi-tonal version of the image (e.g., a black and white image) from the image (e.g., from an original image, from a grayscale image, from a normalized grayscale image). For example, some embodiments of the barcode-reading device determine the bi-tonal threshold according to the following:

If PixelMeanValue<150, then
 Threshold=PixelMeanValue+85, else Threshold=PixelMeanValue.

Additionally, in a bi-tonal image, the edges may be easier to identify, and a shipping label may stand out more.

FIG. 5B shows a lower-resolution image 506, which is a lower-resolution version of the image 505 from FIG. 5A. Some embodiments of a barcode-reading device resize an image (e.g., an original image, a grayscale image, a bi-tonal image, a normalized grayscale image) to reduce the resolution. For example, the size may be adjusted by a factor of 2, 4, 6, 8, or 16, and an image that has been resized by a factor of 2 would have ½ the resolution of the original image. The lower-resolution image 506 in FIG. 5A is a resized version of the grayscale image 505 from FIG. 5A. Some embodiments of the barcode-reading device use a resized version when normalizing an image, when determining a threshold for a bi-tonal image, when generating a bi-tonal image, or when detecting an SLCA.

FIG. 5B also shows an SLCA 534 that was identified in the lower-resolution image 506. Because of the smaller size of the lower-resolution image 506, a barcode-reading device may be able to more quickly identify an SLCA in the lower-resolution image 506. For example, normalizing the lower-resolution image 506 and generating a bi-tonal image from the lower-resolution image 506 may require less time than they would require using the original grayscale image 505 or the original color image.

However, an SLCA in a lower-resolution image may not be ideal. For example, like the SLCA 534 in FIG. 5B, an SLCA may include other labels 533 in addition to a shipping label 531. Also, the resolution of the barcodes 532 may be too low for a barcode-reading device to read the barcodes 532. Furthermore, an SLCA may have a clipped label, which may be referred to herein as a "clipped SLCA."

FIGS. 6-10 are example embodiments of images that were captured as a package was moved by a conveyor system. FIGS. 6-10 are organized sequentially and show the package 630 as the package 630 is carried by the conveyor system 620 along the y-axis.

Figure 6:
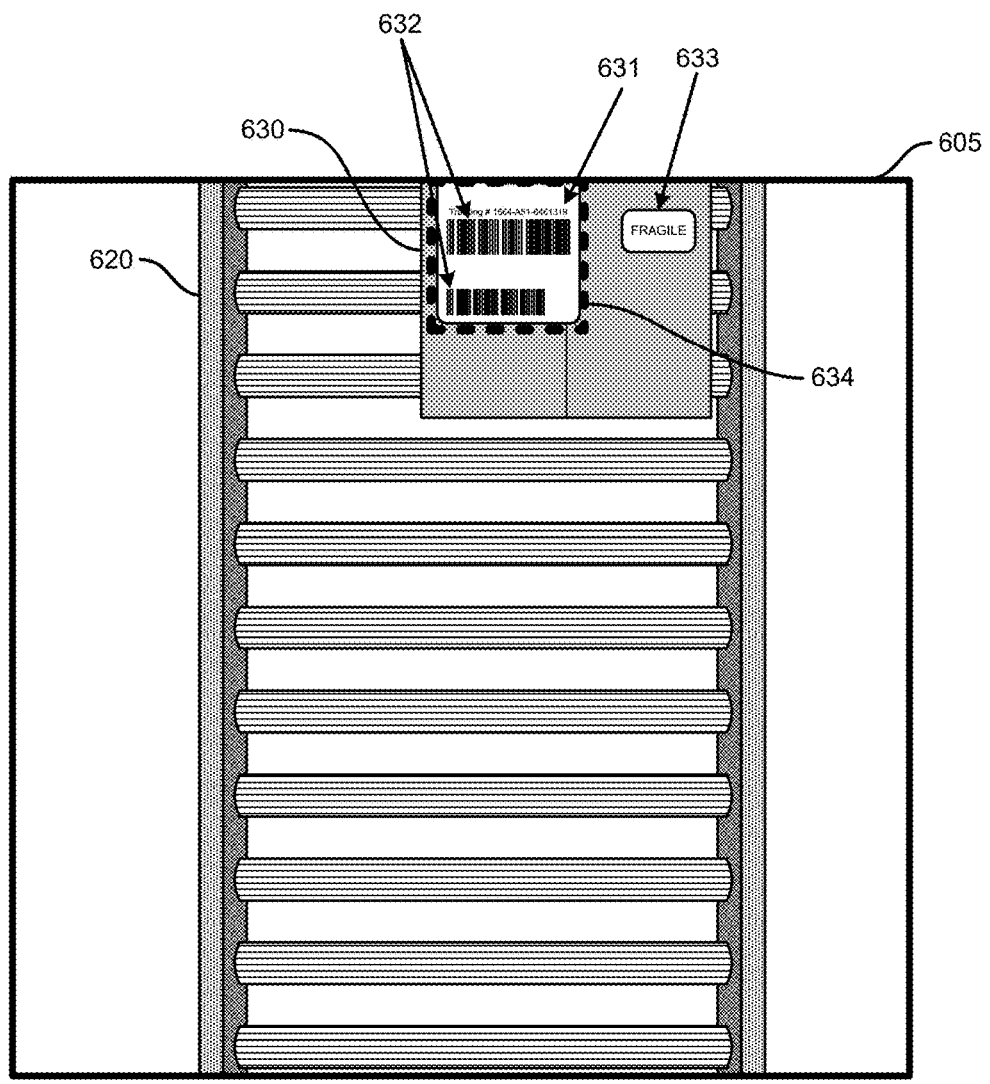
FIGS. 6-10 are example embodiments of images that were captured as a package was moved by a conveyor system.

FIG. 6 shows the first image 605 of the package 630 on the conveyor system 620. The package 630 had not entirely entered the field of view of the image-capturing device, so part of the package 630 was not captured in the first image 605. Also, the first image 605 does not show the entire shipping label 631, although it does show the entirety of another label 633. Thus, both the package 630 and the shipping label 631 are clipped in the first image 605. Additionally, FIG. 6 shows the boundaries of an SLCA 634 that includes the visible portion of the shipping label 631. Because the SLCA 634 includes a clipped shipping label 631, the SLCA 634 is clipped.

Figure 7:
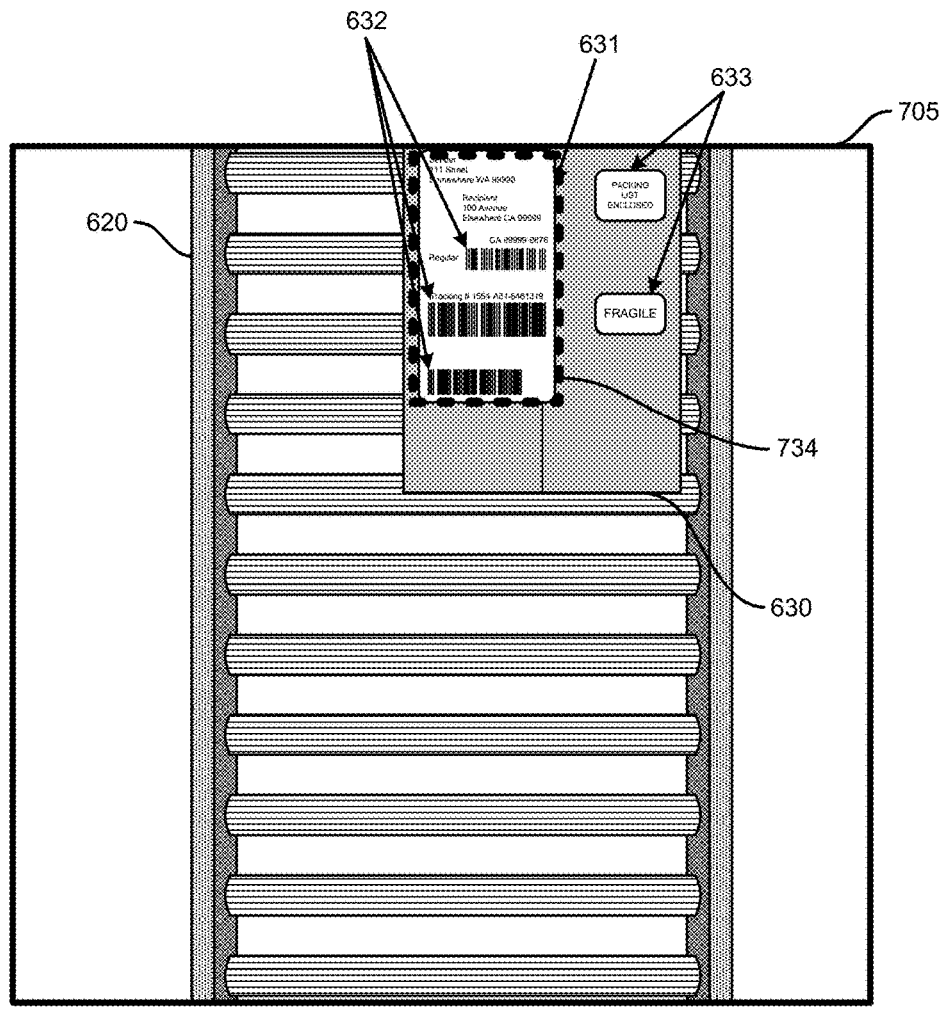

FIG. 7 shows the second image 705. In the second image 705, the package 630 had not entirely entered the field of view of the image-capturing device, so part of the package 630 was not captured in the second image 705. However, the second image 705 does show the entire shipping label 631, as well as two other labels 643. Thus, the package 630, but not the shipping label 631, is clipped in the second image 705. Also, FIG. 7 shows the boundaries of an SLCA 734 that includes the shipping label 631. Depending on how a clipped SLCA is defined (for example, see block B1110 in FIG. 11), the SLCA 734 may be clipped.

Figure 8:
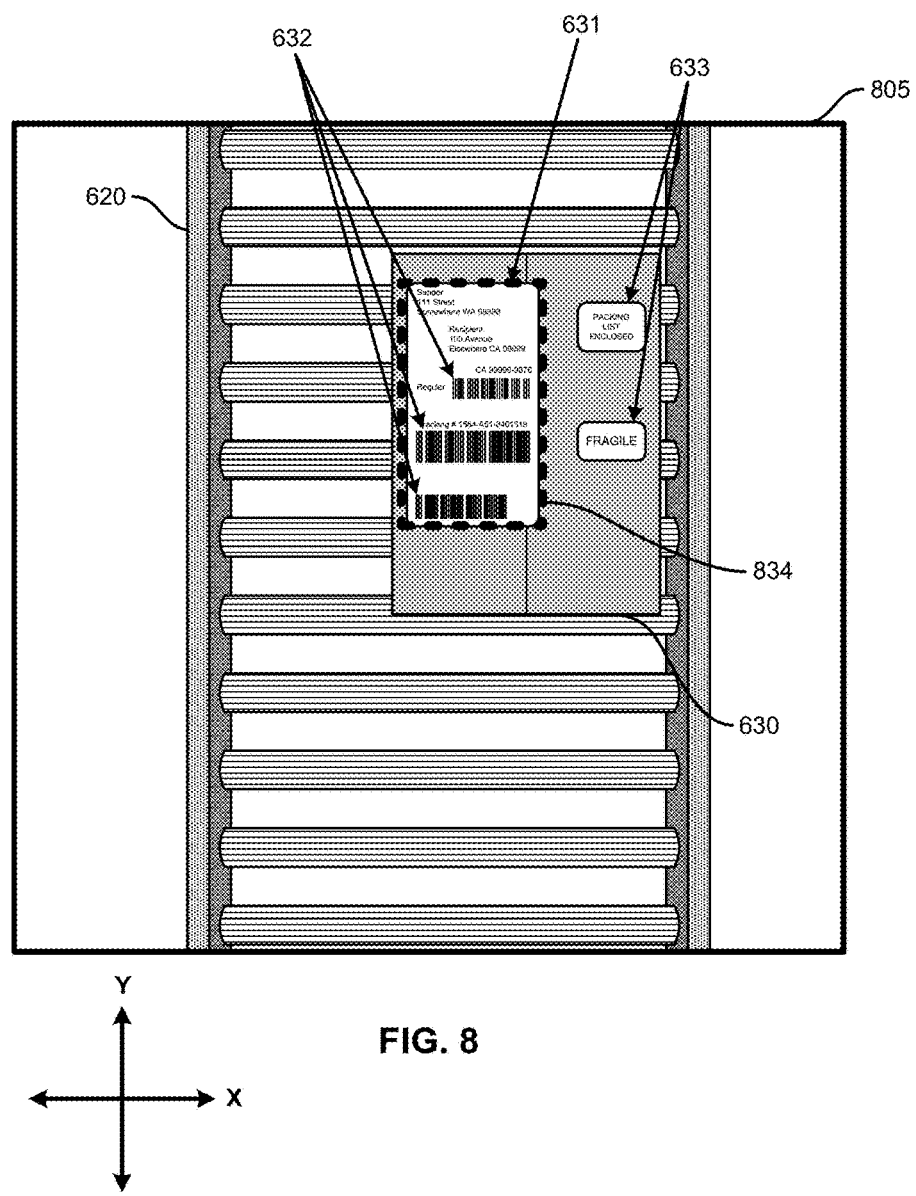

FIG. 8 shows the third image 805. When the third image 805 was captured, the package 630 had moved so far on the y-axis that the entire package 630 was in the field of view of the image-capturing device, and the entire package 630 and the entire shipping label 631 are visible. Thus, the package 630 and the shipping label 631 are not clipped in the third image 805. And FIG. 8 shows the boundaries of an SLCA 834 that includes the shipping label 631. The SLCA 834 is not clipped.

Figure 9:
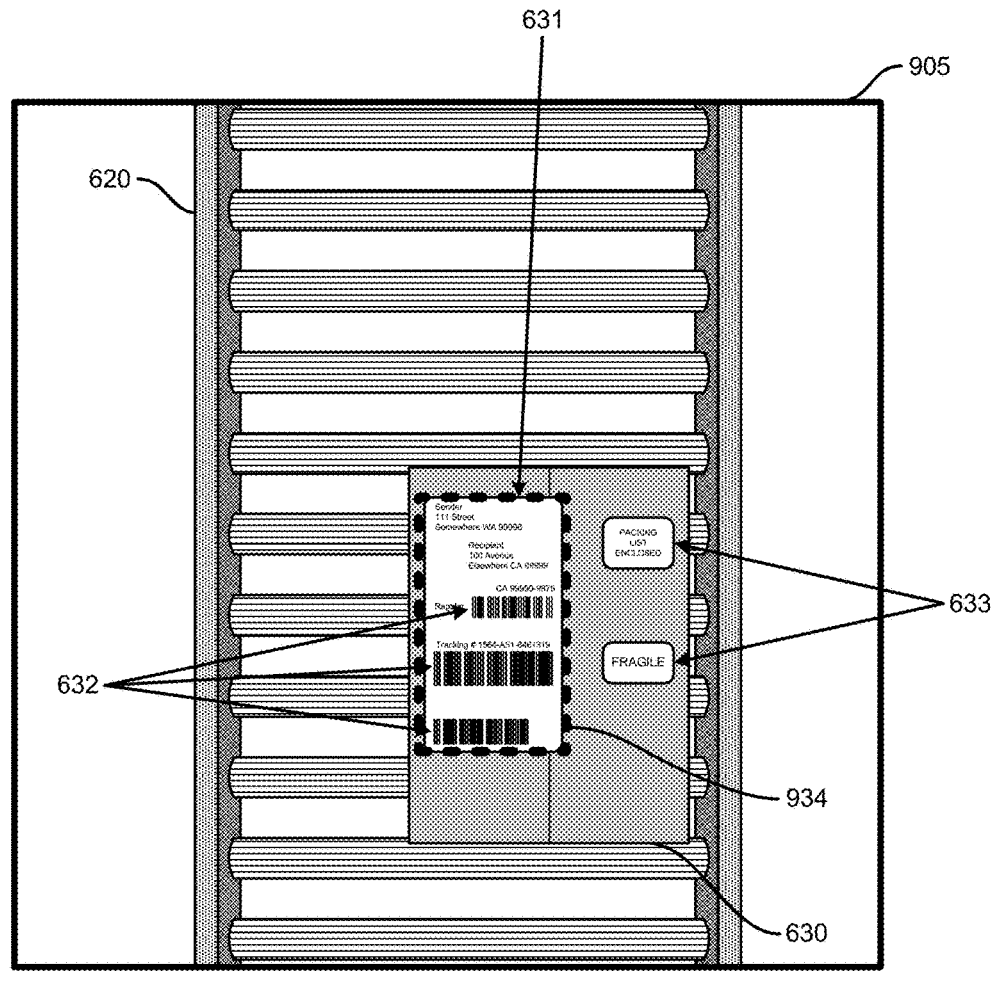

FIG. 9 shows the fourth image 905. Although when the fourth image 905 was captured the package 630 had moved on the y-axis relative to the third image 805, the entire package 630 and the entire shipping label 631 were in the field of view of the image-capturing device. Thus, in the fourth image 905, the entire package 630 and the entire shipping label 631 are visible, and the package 630 and the shipping label 631 are not clipped. Also, FIG. 9 shows the boundaries of an SLCA 934 that includes the shipping label 631, and the SLCA 934 is not clipped.

Figure 10:
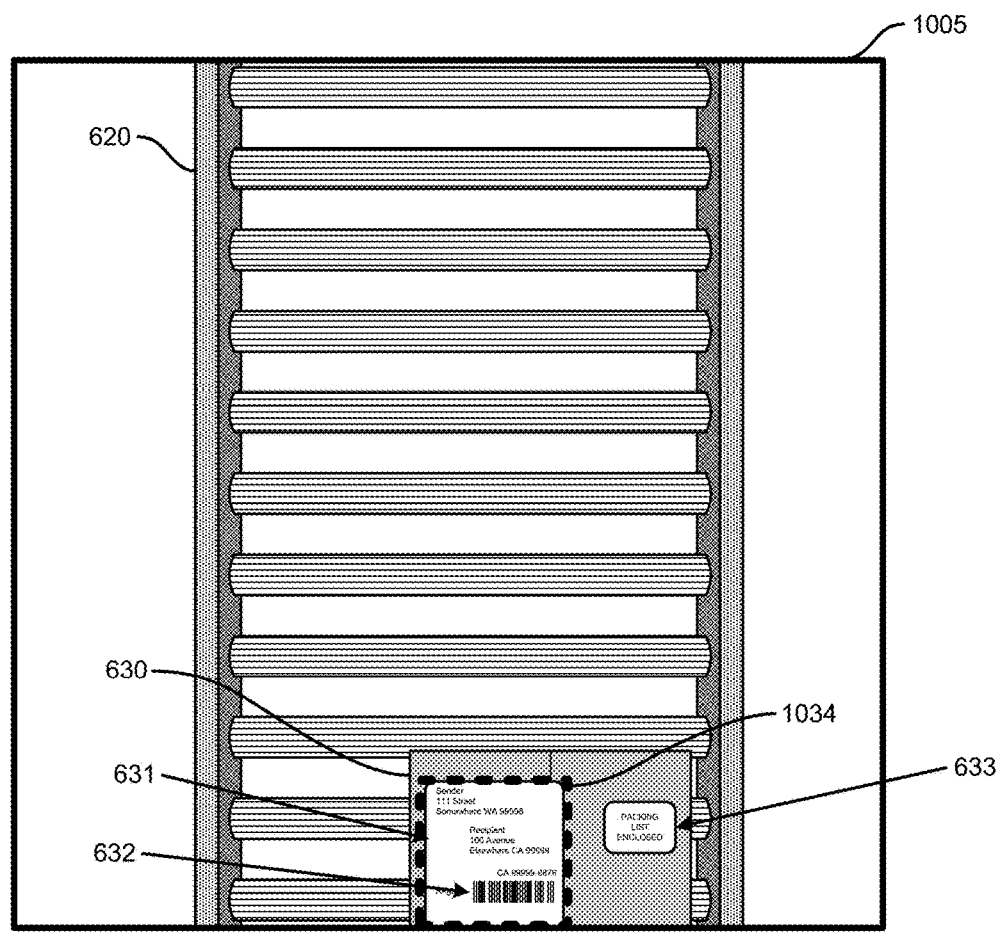

FIG. 10 shows the fifth image 1005. By the time that the fifth image 1005 was captured, the conveyor system 620 had moved the package 630 so far on the y-axis that part of the package 630 was no longer in the field of view of the image-capturing device. Thus, the package 630 and the shipping label 631 are clipped, although one barcode 632 and another label 633 are depicted in the fifth image 1005. Additionally, FIG. 10 shows the boundaries of an SLCA 1034 that includes the visible portion of the shipping label 631. Because the SLCA 1034 includes a clipped shipping label 631, the SLCA 1034 is clipped.

FIG. 11 illustrates an operational flow for determining if an SLCA includes an adequate label. The flow starts in block B1100 and then moves to block B1105, where a barcode-reading device obtains a low-resolution version of an SLCA from an image. In some embodiments, this includes one or more of the following: resizing an image, generating a grayscale version of an image, normalizing a grayscale image, and calculating a bi-tonal threshold and generating a bi-tonal version of an image. In some embodiments, an SLCA is identified by detecting white-connected components in the image (e.g., a resized, grayscale image; a resized, bi-tonal image). For example, in FIG. 5A, the components (e.g., barcodes, text) in the shipping label 531 are white-connected components because they are surrounded by white. Thus, the boundaries of an SLCA can be defined to include the white area and everything that is encompassed by the white area.

Next, in block B1110, the barcode-reading device determines if the SLCA is clipped. In some embodiments, the barcode-reading device determines that the SLCA is clipped if the SLCA shares an edge with the image (e.g., the SLCA 634 in FIG. 6 and the SLCA 1034 in FIG. 10) or if the SLCA is very close to an edge of the image (e.g., the SLCA 734 in FIG. 7). If the barcode-reading device does determine that the SLCA is clipped (block B1110=Yes), then the flow moves to block B1155. Otherwise (block B1110=No) the flow moves to block B1115.

In block B1115, the barcode-reading device determines if the SLCA has the shape of a shipping label. For example, the barcode-reading device may determine whether an SLCA has an expected aspect ratio. If a shipping label is a rectangle, then the expected aspect ratio may be the aspect ratio of a rectangle. If an SLCA is square or nearly square, and if the expected aspect ratio is the aspect ratio of a rectangle, then the SLCA does not have the expected aspect ratio, and the barcode-reading device determines that the SLCA does not have the shape of a label. Some embodiments of the barcode-reading device determine that an SLCA is square if the SLCA has an aspect ratio (AR) of one. Also, some embodiments of the barcode-reading device determine that an SLCA is nearly square according to the following:

$$delta_t < AR_{tolerance},$$

where $$AR = \frac{\text{Max(height, width)}}{\text{MIN(height, width)}},$$

where $$\text{delta} = |AR - 1.0|,$$

and where $AR_{tolerance}$ defines a tolerance range (e.g., 0.05, 0.1, 0.15, 0.2, 0.25).

Also, some embodiments of the barcode-reading device determine that an SLCA does not have the shape of a shipping label if the SLCA has a low aspect ratio. In some embodiments, the aspect ratio is low if AR<1.1, if AR<1.25, or, alternatively, if AR<1.5. Furthermore, some embodiments of the barcode-reading device determine that an SLCA does not have the shape of a shipping label if the SLCA has a low aspect ratio and if the SLCA satisfies another criterion. For example, the other criterion may be an SLCA that is large relative to the image size, an SLCA that is wide relative to the image size, and an SLCA that is tall relative to the image size. In some embodiments, an SLCA is large relative to the image size if $$\frac{(W_{slca} \times H_{slca})}{(W_{image} \times H_{image})} > ST,$$

where $W_{blob}$ is the width of the SLCA, where $H_{blob}$ is the height of the SLCA, where $W_{image}$ is the width of the image, where $H_{image}$ is the height of the image, and where ST is the relative size threshold (e.g., 0.1, 0.25, 0.3, 0.4, 0.45, 0.5). In some embodiments, an SLCA is wide relative to the image size if $$W_{blob}/W_{image} > WT,$$

where HT is the width threshold (e.g., 0.1, 0.25, 0.3, 0.4, 0.45, 0.5).

And in some embodiments, an SLCA is tall relative to the image size if $$H_{blob}/H_{image} > HT,$$

where S=HT is the height threshold (e.g., 0.1, 0.25, 0.3, 0.4, 0.45, 0.5).

Moreover, in some embodiments of the operational flow (e.g., embodiments that omit block B1110), the barcode-reading device determines that an SLCA does not have the shape of an SLCA if the SLCA has a marginal aspect ratio and is also clipped. For example, if a shipping label has an expected aspect ratio of 1.9, then an aspect ratio of 1.5 to 1.7 may be marginal. In some embodiments, an aspect ratio is a marginal aspect ratio if it is within 5%, 10%, 15%, or 20% of an expected aspect ratio.

If in block B1115 the barcode-reading device determines that the SLCA has the shape of a label (block B1115=Yes), then the flow moves to block B1120. Otherwise (block B1115=No) the flow moves to block B1135. In block B1120, the barcode-reading device determines if the SLCA has the size of a shipping label. This may include determining if the size of the SLCA, as measured in pixels, falls within a particular range. This may also include determining if the SLCA covers more than a certain percentage of the image (e.g., more than 10%, more than 25%, more than 50%, more than 75%). The barcode-reading device may determine that an SLCA does not have the size of a label if the SLCA is large relative to the image size, if the SLCA is wide relative to the image size, or if the SLCA is tall relative to the image size, for example as described above. However, the size of the SLCA may also indicate that the package is tall and the shipping label is close to the image-capturing device.

If in block B1120 the barcode-reading device determines that the SLCA has the size of a label (block B1130=Yes), then the flow moves to block B1125. Otherwise (block B1120=No) the flow moves to block B1135. In block B1125, the barcode-reading device determines if the SLCA includes a readable barcode, for example by using the functionality of a library or by inputting the SLCA to a barcode-reading function or module and determining if the function or module can return a barcode. If the barcode-reading device determines that the SLCA includes a readable barcode (block B1125=Yes), then the flow moves to block B1130. In block B1130, the barcode-reading device determines that the SLCA includes an adequate label, and then the flow ends in block B1165. However, if the barcode-reading device determines that the SLCA does not include a readable barcode (block B1125=No), then the flow moves to block B1140. Also, in embodiments that omit block B1125, the operational flow may proceed from block B1120 directly to block B1130.

In block B1135, the barcode-reading device determines whether to re-generate the SLCA. For example, the barcode-reading device may determine to re-generate the SLCA if the resolution of the SLCA is lower than the resolution of the originally-obtained image. Also for example, the barcode-reading device may determine to re-generate the SLCA if the SLCA includes a readable utilitarian barcode but not a readable barcode of interest. A utilitarian barcode is a barcode that is not a barcode of interest but is a barcode that indicates that an SLCA includes a shipping label. For example, a barcode that encodes a ZIP code or a container ID can be a utilitarian barcode if only a barcode that encodes a tracking number is a barcode of interest. A utilitarian barcode may be easier to read than a barcode of interest, for example because it has fewer characters, a lower bar density, or longer bars.

If the barcode-reading device determines to re-generate the SLCA (block B1135=Yes), then the flow proceeds to block B1150. In block B1150, the barcode-reading device inflates the SLCA. Inflating the SLCA increases the size of the SLCA by an inflation value (e.g., 5 pixels, 10 pixels, 15, pixels, 20 pixels, 25 pixels, 50 pixels, and 100 pixels) on each side. Thus, if the inflation value is 25 pixels and the SLCA is 200×300 pixels, then the inflated SLCA will be 250×350 pixels. The flow then moves to block B1155.

In block B1155, the barcode-reading device obtains a higher-resolution version of the inflated SLCA. For example, if an SLCA was resized by a factor of 16, the higher-resolution version of the inflated SLCA may be resized by a factor of 4. In some embodiments, the barcode-reading device extracts the inflated SLCA from a resized version of the originally-captured image. For example, if the SLCA was resized by a factor of 8, then the barcode-reading device may resize the originally-captured image by a factor of 2 and then extract the inflated SLCA from the resized image. In some embodiments, if the SLCA was resized by a factor of 16, then the originally-captured image is resized using a factor of 4; if the SLCA was resized by a factor of 8, then the originally-captured image is resized using a factor of 2; and if the SLCA was resized by a factor of 4 or 2, then the originally-captured image is not resized.

Next, in block B1160, the barcode-reading device extracts a new SLCA from the higher-resolution version of the inflated SLCA. After block B1160 the flow returns to block B1115, which is performed using the SLCA that was generated in block B1160.

However, if in block B1135 the barcode-reading device determines not to re-generate the SLCA (block B1135=No), then the flow proceeds to block B1155. For example, the barcode-reading device may determine not to re-generate the SLCA if the SLCA was extracted from the highest resolution version or the full-color version of the image. In block B1155, the barcode-reading device determines that the SLCA does not include an adequate label, and then the flow ends in block B1165.

Additionally, in block B1140, the barcode-reading device determines whether to re-generate the SLCA. If the barcode-reading device determines to re-generate the SLCA (block B1140=Yes), for example using the same criteria used in block B1135, then the flow proceeds to block B1150. If the barcode-reading device determines not to re-generate the SLCA (block B1140=No), then the second flow advances to block B1145. In block B1145, the barcode-reading device determines that the SLCA includes a marginal label. Thus, in this example embodiment, a marginal label is not clipped and has the size and shape of a shipping label, but does not have a readable barcode. For example, the barcode may not be readable because of glare, inadequate lighting, blurriness, or image artifacts. Finally, the flow ends in block B1165.

Figure 12A:
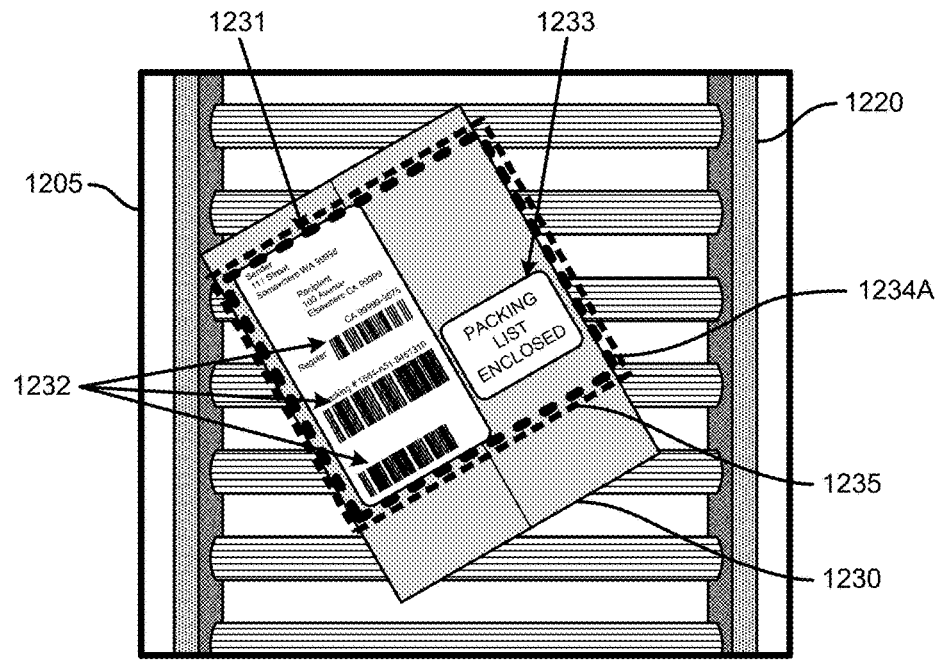
FIGS. 12A and 12B illustrate example embodiments of SLCAs.
Figure 12B:
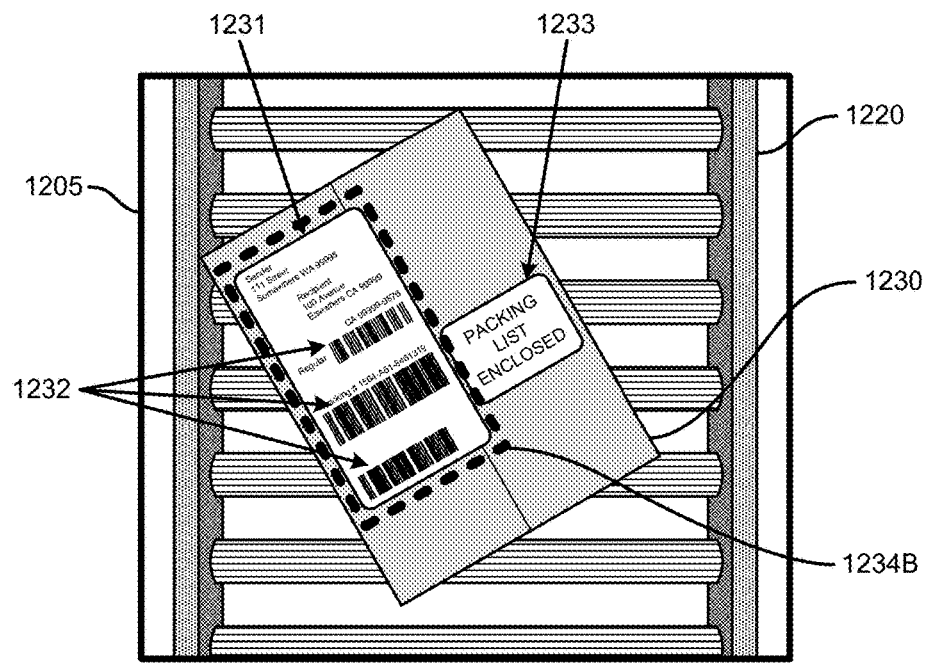

The following description uses FIGS. 12A and 12B to illustrate an example embodiment of the operational flow in FIG. 11. FIGS. 12A and 12B illustrate example embodiments of SLCAs. FIG. 12A shows a first SLCA 1234A that was extracted from an image 1205. The image 1205 shows a package 1230 on a conveyor system 1220, and the package 1230 includes a shipping label 1231, which has three barcodes 1232, and another label 1233. FIG. 12B shows a second SLCA 1234B that was extracted from the image 1205.

In this example, the first SLCA 1234A was generated from a resized version of the image 1205 that was resized by a factor of 8. Also, the expected aspect ratio of a shipping label is 1.85, and an aspect ratio is a marginal aspect ratio if it is within 10% of the expected aspect ratio. In block B1105, the barcode-reading device extracts the first SLCA 1234A from the resized version of the image 1205. Next, in block B1110, the barcode-reading device determines that the first SLCA 1234A is not clipped because the first SLCA 1234A is not close to an edge of the image 1205 and does not share an edge with the image 1205. Thus, the flow moves to block B1115, where the barcode-reading device determines whether the first SLCA 1234A has the shape of a shipping label. Because the first SLCA 1234A has an aspect ratio of approximately 1.08, the barcode-reading device determines that the first SLCA 1234A does not have the shape of a shipping label, and the flow proceeds to block B1135.

In block B1135, the barcode-reading device determines that the first SLCA 1234A should be regenerated because the image 1205 has a higher resolution than the resolution of the first SLCA 1234A. The flow then moves to block B1140, where the barcode-reading device inflates the first SLCA 1234A, thereby generating an inflated SLCA 1235. Then in block B1145, the barcode-reading device obtains a higher-resolution version of the inflated SLCA 1235 from the image 1205. In this example, the higher-resolution version of the inflated SLCA 1235 was resized by a factor of 2. The flow then proceeds to block B1150, where the barcode-reading device extracts the second SLCA 1234B from the higher-resolution version of the inflated SLCA 1235, and the flow returns to block B1115.

In block B1115, the barcode-reading device determines that the second SLCA 1234B has the shape of a shipping label because the second SLCA 1234B has an aspect ratio of approximately 1.83. Therefore, the aspect ratio of the second SLCA 1234B is a marginal aspect ratio.

The flow proceeds to block B1120, where the barcode-reading device determines whether the second SLCA 1234B has the size of a shipping label. In this example, because the second SLCA 1234B occupies less than 20% of the image 1205, the barcode-reading device determines that the second SLCA 1234B has the size of a shipping label. Next, in block B1125, the barcode-reading device determines that the second SLCA 1234B includes at least one readable barcode. The flow then moves to block B1130, where the barcode-reading device determines that the second SLCA 1234B includes an adequate label, and then the flow ends in block B1165.

FIG. 13A illustrates an example embodiment of an SLCA, and FIG. 13B illustrates an example embodiment of an inflated SLCA. FIG. 13A illustrates the SLCA 1334 without any of the image 1305 from which the SLCA 1334 was extracted. FIG. 13B illustrates the image 1305 and the SLCA 1334. In addition, it also shows the inflated SLCA 1335. To make the size difference between the SLCA 1334 and the inflated SLCA 1335 more visible, the size difference between the SLCA 1334 and the inflated SLCA 1335 is larger than it would be in some embodiments.

FIGS. 13C and 13D illustrate example embodiments of SLCAs that were extracted from an inflated SLCA. The SLCA 1338 in FIG. 13C and the SLCA 1339 in FIG. 13D were both extracted from the inflated SLCA 1335 in FIG. 13B. Thus, as shown by FIGS. 13B, 13C, and 13D, more than one SLCA can be extracted from an inflated SLCA.

Figure 14A:
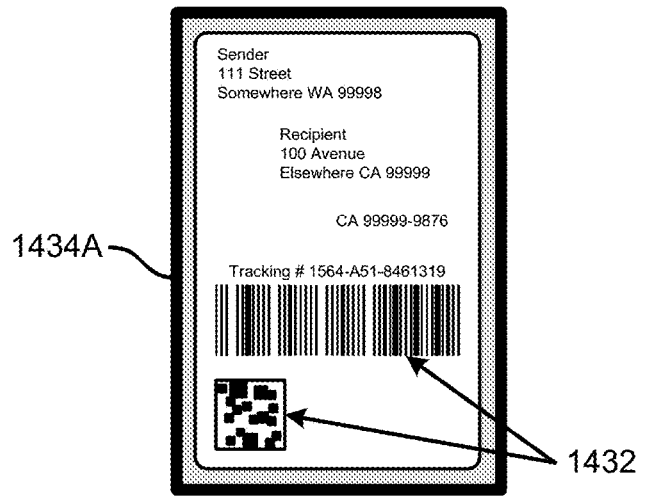
FIGS. 14A and 14B illustrate example embodiments of SLCAs.
Figure 14B:
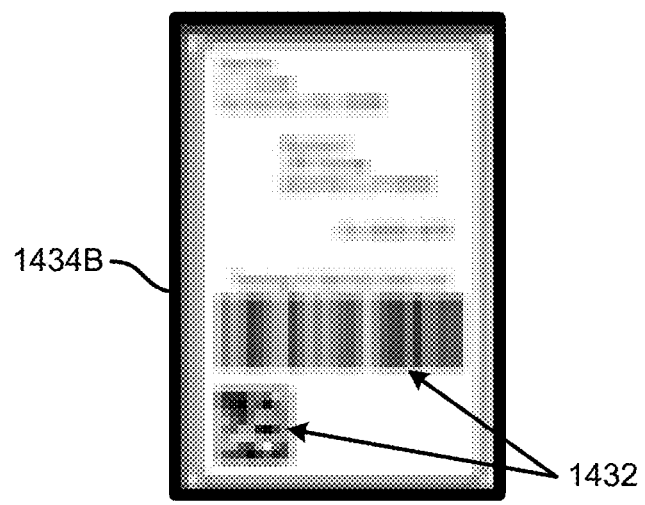

FIGS. 14A and 14B illustrate example embodiments of SLCAs. The SLCA 1434A in FIG. 14A is a higher-resolution version of the SLCA 1434B in FIG. 14B. Both SLCAs 1434A-B include two barcodes 1432, one of which is a two-dimensional barcode. However, the two barcodes 1432 may not be readable in the SLCA 1434B in FIG. 14B. Accordingly, some embodiments of a barcode-scanning device will generate a higher-resolution version of the SLCA 1434B (e.g., as described in blocks B1150-1160 in FIG. 11), thereby producing the SLCA 1434A in FIG. 14A.

Figure 15:
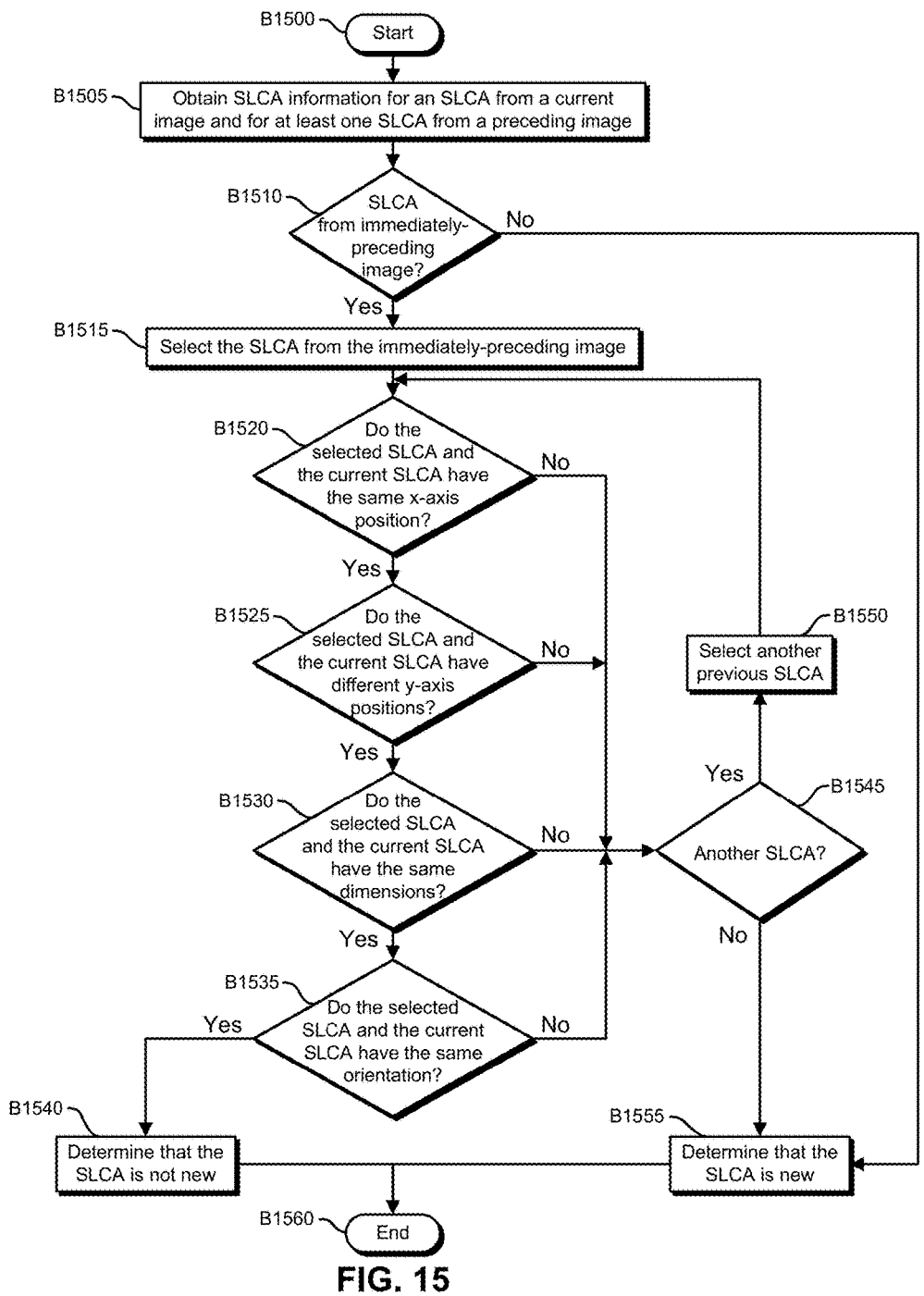
FIG. 15 illustrates an operational flow for determining if an SLCA is new.

FIG. 15 illustrates an operational flow for determining if an SLCA is new. The flow starts in block B1500, and then advances to block B1505, where a barcode-reading device obtains SLCA information for an SLCA from a current image (the current SLCA) and for at least one SLCA from a preceding image. In some embodiments, the SLCA information includes the information for all preceding images or for the preceding x images, where x is a parameter that can be defined by the user or by the barcode-reading device. For example, some embodiments of the barcode-reading device set x based on the speed at which the conveyor system moves packages and on the frame rate of the image-capturing device. Next, in block B1510, the barcode-reading device determines if the SLCA information includes information for an SLCA from the immediately-preceding image, which is the last image before the current image. If the SLCA information does include information for an SLCA from the immediately-preceding image (block B1510=Yes), then the flow proceeds to block B1515. Otherwise (block B1510=No) the flow moves to block B1555. In block B1515, the barcode-reading device selects the SLCA from the immediately-preceding image. Also, some embodiments omit block B1510, and, in block B1515, the barcode-reading device selects an SLCA based on one or more other criteria (e.g., in reverse order of the detection of the SLCAs).

The flow then moves to block B1520, where the barcode-reading device determines if the selected SLCA and the current SLCA have the same x-axis position. If the x-axis and the y-axis are oriented such that conveyor system moves packages along the y-axis, then the packages probably do not move much on the x-axis. Thus, an SLCA that is extracted from images of a package probably does not move much on the x-axis. Some embodiments of the barcode-reading device determine that the selected SLCA and the current SLCA have the same x-axis position if their x-axis positions are within a defined tolerance (e.g., 2% of the image width in pixels, 4% of the image width in pixels, 6% of the image width in pixels). If the selected SLCA and the current SLCA have the same x-axis position (block B1520=Yes), then the flow moves to block B1525. Otherwise (block B1520=No) the flow moves to block B1545.

In block B1530, the barcode-reading device determines if the selected SLCA and the current SLCA have different y-axis positions. If the x-axis and the y-axis are oriented such that conveyor system moves packages along the y-axis, then an SLCA moves on the y-axis (depending on the orientation of the y-axis, the y-axis coordinates either increase or decrease). Accordingly, an unchanging position on the y-axis may indicate a problem (e.g., a package is stuck, a camera is frozen, an SLCA does not include a package). If the barcode-reading device determines that the selected SLCA and the current SLCA have different y-axis positions (block B1525=Yes), then the flow proceeds to block B1530. Otherwise (block B1525=No) the flow moves to block B1545.

In block B1530, the barcode-reading device determines whether the selected SLCA and the current SLCA have the same dimensions. In some embodiments, the barcode-reading device determines that the selected SLCA and the current SLCA have the same dimensions if their widths are within a defined tolerance (e.g., 2%, 4%, 6%) of the image width and if their heights are within a defined tolerance (e.g., 2%, 4%, 6%) of the image height. If the barcode-reading device determines that the selected SLCA and the current SLCA have the same dimensions (block B1530=Yes), then the flow advances to block B1535. Otherwise (block B1530=No) the flow moves to block B1545.

In block B1535, the barcode-reading device determines whether the selected SLCA and the current SLCA have the same orientation. In some embodiments, the barcode-reading device determines that the selected SLCA and the current SLCA have the same orientation if their orientations are within a defined tolerance (e.g., 1° 2°, 4°, 6°). If the barcode-reading device determines that the selected SLCA and the current SLCA have the same orientation (block B1535=Yes), then the flow moves to block B1540, where the barcode-reading device determines that the current SLCA is not new, and the flow ends in block B1560. Otherwise (block B1535=No) the flow moves to block B1545.

In block B1545, the barcode-reading device determines if another SLCA is to be evaluated. For example, if the immediately-preceding image includes another SLCA or if the barcode-reading device obtained SLCA information for an unevaluated SLCA, then the barcode reading-device may determine that another SLCA is to be evaluated. If so (block B1545=Yes), then the flow moves to block B1550, where another previous SLCA is selected. Otherwise (block B1545=No) the flow moves to block B1555.

In block B1555, the barcode-reading device determines that the SLCA is new, and then the flow ends in block B1560.

For example, consider the third image 805 from FIG. 8 and the fourth image 905 from FIG. 9. If the fourth image 905 is the current image, then in block B1505 the barcode-reading device obtains the SLCA information for the SLCA 934 from the fourth image 905 and the SLCA information for the SLCA 834 from the third image 805, which is a preceding image. Next, in block B1510, the barcode-reading device determines that it has obtained SLCA information from an SLCA from the image that immediately precedes the fourth image 905, which is the third image 805. The flow then moves to block B1515, where the barcode-reading device selects the SLCA 834 from the third image 805. The flow then proceeds to block B1520, where the barcode-reading device determines if the SLCA 934 from the fourth image 905 and the SLCA 834 from the third image 805 have the same position on the x-axis. Because their x-axis positions are within a predefined tolerance, which is 3% of the pixels in the width of the third image 805 and the fourth image 905, the barcode-reading device determines that these SLCAs have the same position on the x-axis.

Next, in block B1525, the barcode-reading device determines that the SLCA 934 from the fourth image 905 and the SLCA 834 from the third image 805 have different positions on the y-axis. Then, in block B1530, the barcode-reading device determines that the SLCA 934 from the fourth image 905 and the SLCA 834 from the third image 805 have the same dimensions because their widths and heights are within a 2.5% tolerance. The flow then moves to block B1535, where the barcode-reading device determines that the SLCA 934 from the fourth image 905 and the SLCA 834 from the third image 805 have the same orientation because their angles are within a 3° tolerance. The flow proceeds to block B1540, where the barcode-reading device determines that the SLCA 934 from the fourth image 905 is not new, and then the flow ends in block B1560.

Figure 16:
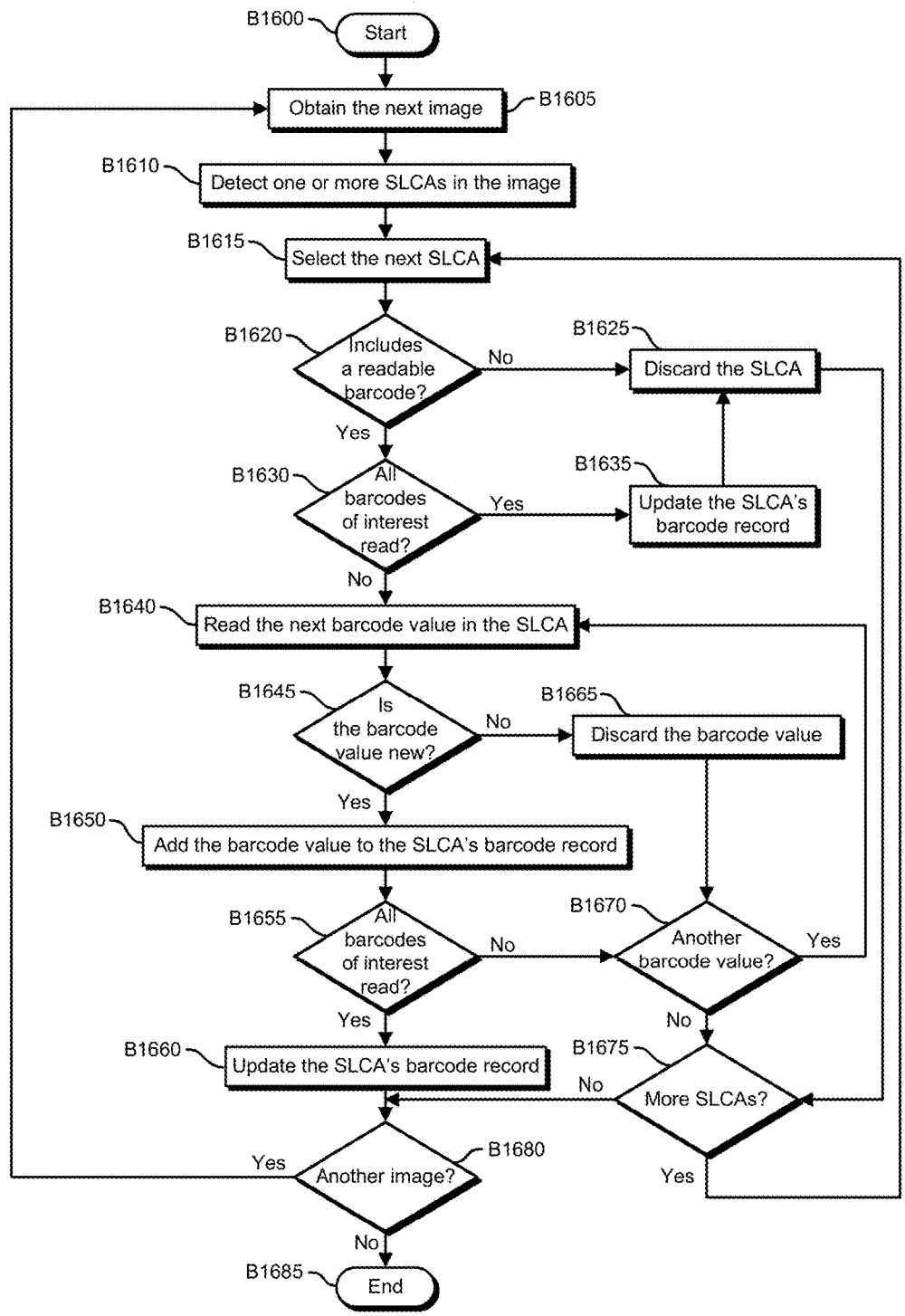
FIG. 16 illustrates an example embodiment of an operational flow for reading barcodes.

FIG. 16 illustrates an example embodiment of an operational flow for reading barcodes. The flow starts in block B1600. Next, in block B1605, a barcode-reading device obtains the next image in an image stream. The flow then moves to block B1610, where the barcode-reading device detects one or more SLCAs in the image. Then in block B1615, the barcode-reading device selects the next SLCA in the image. In the first iteration of block B1615, the next SLCA will be the first SLCA in the image.

The flow then moves to block B1620, where the barcode-reading device determines if the selected SLCA includes at least one readable barcode. In some embodiments, the barcode-reading device attempts to read all of the barcodes in the SLCA and determines that the SLCA does not include at least one readable barcode if the barcode-reading device is not able to read at least one barcode. If the SLCA does include at least one readable barcode (block B1620=Yes), then the flow advances to block B1630. Otherwise (block B1620=No) the flow moves to block B1625. In block B1630, the barcode-reading device determines if all of the barcodes of interest in the SLCA have been read. If they have been read (block B1630=Yes), then the flow moves to block B1635. If they have not been read (block B1630=No), then the flow moves to block B1640.

In block B1635, the barcode-reading device updates the SLCA's barcode record to indicate that all the barcodes of interest have been read. The flow then moves to block B1625.

In block B1625, the barcode-reading device discards the SLCA, although the barcode-reading device may retain the barcode values and may retain the SLCA information, and then the flow proceeds to block B1675.

In block B1640, which is performed in some embodiments where barcodes are not read in block B1620, the barcode-reading device reads the next barcode value in the SLCA. In the first iteration of block B1640, the next barcode value is the first barcode value. Next, in block B1645, the barcode-reading device determines if the barcode value is new. If the barcode value is not new (block B1645=No), which indicates that the barcode value has already been read, then the flow moves to block B1665. If the barcode value is new (block B1645=Yes), then the flow moves to block B1650.

In block B1665, the barcode-reading device discards the barcode value, and then the flow proceeds to block B1670.

In block B1650, the barcode-reading device adds the barcode value to the SLCA's barcode record. Next, in block B1655, the barcode-reading device determines if all barcodes of interest have been read. In some embodiments, all of the barcodes are barcodes of interest. If they have not all been read (block B1655=No), then the flow moves to block B1670. Otherwise (block B1655=Yes) the flow moves to block B1660. In block B1660, the barcode-reading device updates the SLCA's barcode record to indicate that all the barcodes of interest have been read. The flow then moves to block B1680.

In block B1670, the barcode-reading device determines if the SLCA includes a barcode value that has not been considered. If it does (block B1670=Yes), then the flow returns to block B1640. If all the barcode values were read in block B1620, then the flow may return to block B1645. Otherwise (block B1670=No) the flow proceeds to block B1675.

In block B1675, the barcode-reading device determines if the image includes more SLCAs. If the image does include more SLCAs (block B1675=Yes), then the flow returns to block B1615. Otherwise (block B1675=No) the flow proceeds to block B1680.

In block B1680, the barcode-reading device determines if it should attempt to read barcode values from another image. If the barcode-reading device determines that it should (block B1680=Yes), then the flow returns to block B1605. Otherwise (block B1680=No) the flow ends in block B1685.

Figure 17:
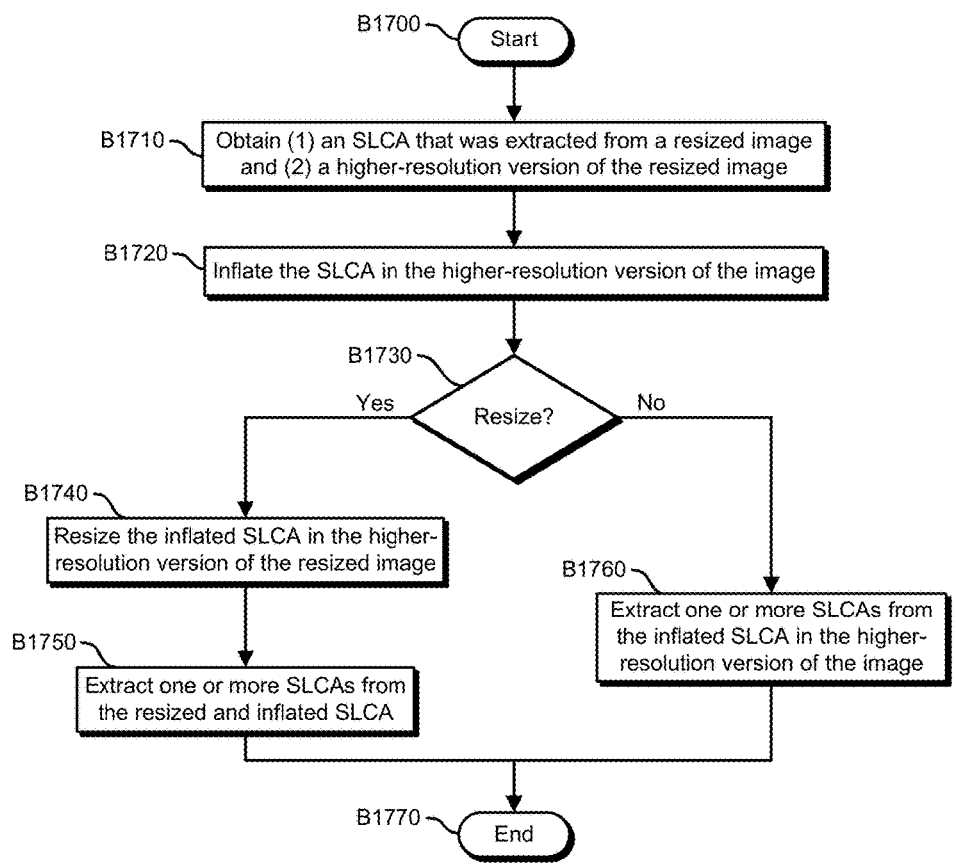
FIG. 17 illustrates an example embodiment of an operational flow for generating a new SLCA from an SLCA.

FIG. 17 illustrates an example embodiment of an operational flow for generating a new SLCA from an SLCA. The flow starts in block B1700 and then proceeds to block B1710, where a barcode-reading device obtains an SLCA that was extracted from a resized image and obtains a higher-resolution version of the resized image (e.g., the originally-captured image). Next, in block B1720, the barcode-reading device inflates the SLCA in the higher-resolution version of the resized image, for example as shown in FIG. 13B.

The flow then moves to block B1730, where the barcode-reading device determines if it should resize the inflated SLCA. If it determines that it should (block B1730=Yes), then the flow moves to block B1740. Otherwise (block B1760=No) the flow proceeds to block B1760.

In block B1740, the barcode-reading device resizes the inflated SLCA in the higher-resolution version of the resized image. The resolution of the resized, inflated SLCA is higher than the resolution of the starting SLCA from block B1710, but lower than the resolution of the higher-resolution version of the resized image. Then in block B1750, the barcode-reading device extracts one or more SLCAs from the resized and inflated SLCA, and the flow ends in block B1770.

In block B1760, the barcode-reading device extracts one or more SLCAs from the inflated SLCA in the higher-resolution version of the image, and then the flow ends in block B1770.

Figure 18:
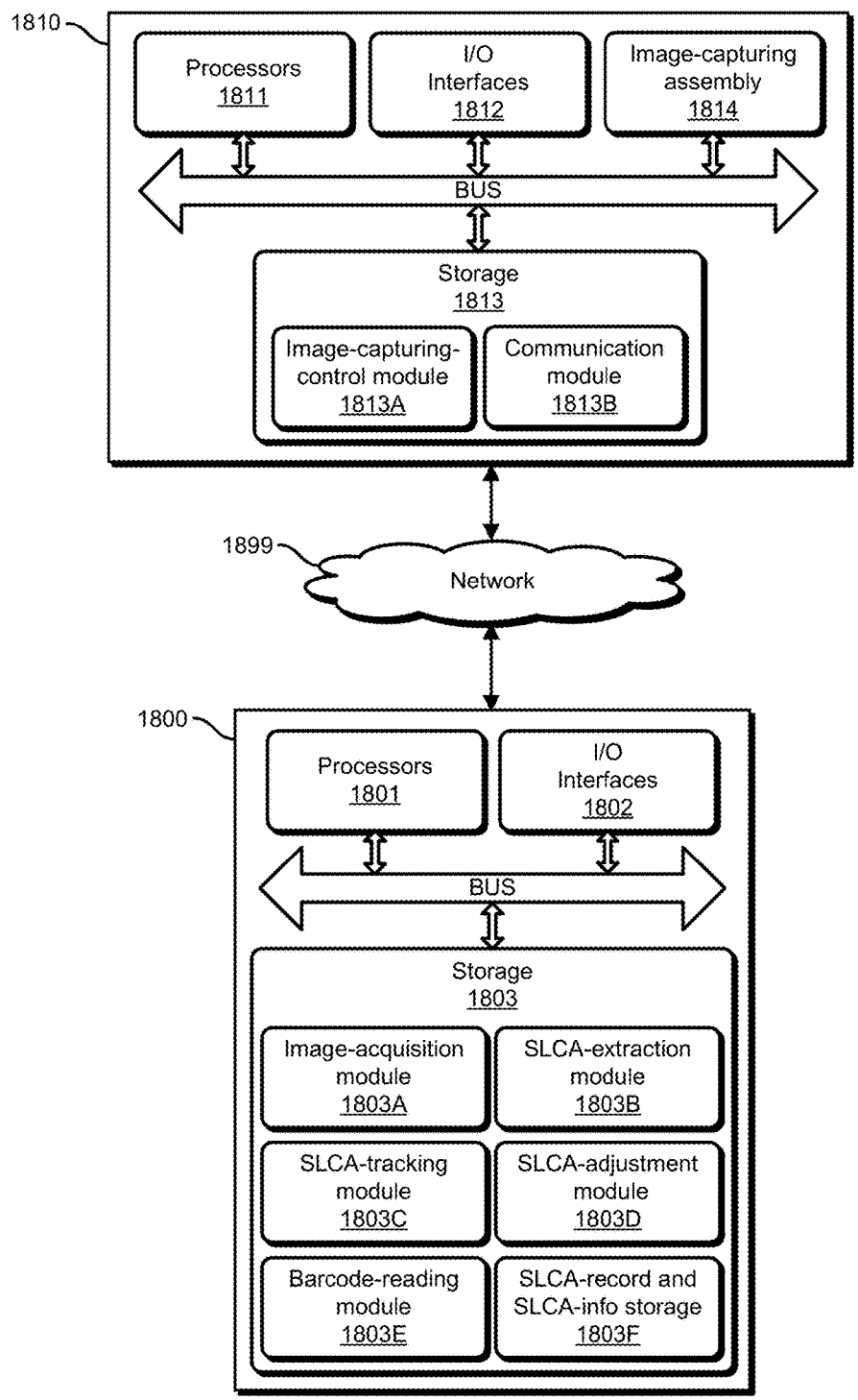
FIG. 18 illustrates an example embodiment of a system for reading barcode values.

FIG. 18 illustrates an example embodiment of a system for reading barcode values. The system includes at least one barcode-reading device 1800 and at least one image-capturing device 1810. In this embodiment, the devices communicate by means of one or more networks 1899, which may include a wired network, a wireless network, a LAN, a WAN, a MAN, and a PAN. Also, in some embodiments the devices communicate by means of other wired or wireless channels.

The barcode-reading device 1800 includes one or more processors 1801, one or more I/O interfaces 1802, and storage 1803. Also, the hardware components of the barcode-reading device 1800 communicate by means of one or more buses or other electrical connections. Examples of buses include a universal serial bus (USB), an IEEE 1394 bus, a PCI bus, an Accelerated Graphics Port (AGP) bus, a Serial AT Attachment (SATA) bus, and a Small Computer System Interface (SCSI) bus.

The one or more processors 1801 include one or more central processing units (CPUs), which include microprocessors (e.g., single core microprocessors, multi-core microprocessors); one or more graphics processing units (GPUs); one or more application-specific integrated circuits (ASICs); one or more field-programmable-gate arrays (FPGAs); one or more digital signal processors (DSPs); or other electronic circuitry (e.g., other integrated circuits). The one or more processors 1801 are configured to read and perform computer-executable instructions, such as instructions that are stored in the storage 1803.

The I/O interfaces 1802 include communication interfaces to input and output devices, which may include a keyboard, a display, a mouse, a printing device, a touch screen, a light pen, an optical-storage device, a scanner, a microphone, the image-capturing device 1810, a drive, a hand-held controller (e.g., a joystick, a control pad), and a network interface controller.

The storage 1803 includes one or more computer-readable storage media. As used herein, a computer-readable storage medium, in contrast to a mere transitory, propagating signal per se, refers to a computer-readable media that includes a tangible article of manufacture, for example a magnetic disk (e.g., a floppy disk, a hard disk), an optical disc (e.g., a CD, a DVD, a Blu-ray disc), a magneto-optical disk, magnetic tape, and semiconductor memory (e.g., a non-volatile memory card, flash memory, a solid-state drive, SRAM, DRAM, EPROM, EEPROM). Also, as used herein, a transitory computer-readable medium refers to a mere transitory, propagating signal per se, and a non-transitory computer-readable medium refers to any computer-readable medium that is not merely a transitory, propagating signal per se. The storage 1803, which may include both ROM and RAM, can store computer-readable data or computer-executable instructions. The storage 1803 includes SLCA-record and SLCA-information storage 1803F.

The barcode-reading device 1800 also includes an image-acquisition module 1803A, an SLCA-extraction module 1803B, an SLCA-tracking module 1803C, an SLCA-adjustment module 1803D, and a barcode-reading module 1803E. A module includes logic, computer-readable data, or computer-executable instructions, and may be implemented in software (e.g., Assembly, C, C++, C#, Java, BASIC, Perl, Visual Basic), hardware (e.g., customized circuitry) or a combination of software and hardware. In some embodiments, the devices in the system include additional or fewer modules, the modules are combined into fewer modules, or the modules are divided into more modules. When the modules are implemented at least in part by software, for example as shown in FIG. 18, the software can be stored in the storage 1803.

The image-acquisition module 1803A includes instructions that, when executed, or circuits that, when activated, cause the barcode-reading device 1800 to obtain one or more images from one or more image-capturing devices, such as the image-capturing device 1810 in FIG. 18, for example as described in blocks B305-B307 in FIG. 3 or in block B1605 in FIG. 16.

The SLCA-extraction module 1803B includes instructions that, when executed, or circuits that, when activated, cause the barcode-reading device 1800 to extract at least one SLCA from one or more images or from another SLCA; to determine if an SLCA has an adequate label or a marginal label; and to store SLCA information, for example as described in blocks B310-B320 in FIG. 3, in blocks B1110-B1145 and B1155 in FIG. 11, or in block B1610 in FIG. 16.

The SLCA-tracking module 1803C includes instructions that, when executed, or circuits that, when activated, cause the barcode-reading device 1800 to determine if an SLCA is new or if the SLCA has already appeared in an image, for example as described in block B325 in FIG. 3 or in blocks B1505-B1555 in FIG. 15.

The SLCA-adjustment module 1803D includes instructions that, when executed, or circuits that, when activated, cause the barcode-reading device 1800 to inflate an SLCA, to generate a higher-resolution version of an SLCA, or to generate a lower-resolution version of an SLCA, for example as described in blocks B1150-B1160 in FIG. 11 or in blocks B1710-B1760 in FIG. 17.

The barcode-reading module 1803E includes instructions that, when executed, or circuits that, when activated, cause the barcode-reading device 1800 to read the values of one or more barcodes in an SLCA, add read barcode values to a barcode record, update an SLCA's barcode record, close an SLCA's barcode record, start an SLCA's harvester, stop an SLCA's harvester, determine if a barcode value has already been read, or determine if all barcodes of interest in an SLCA have been read, for example as described in blocks B335-B350, B360-B365, and B385 in FIG. 3 or as described in blocks B1630-B1670 in FIG. 16.

The SLCA-information and SLCA-record storage 1803F stores SLCA information for respective SLCAs and stores SLCA records for respective SLCAs, including barcode values that have been added to the SLCA records. In some embodiments, the SLCA-information and SLCA-record storage 1803F also includes harvesters for respective SLCAs.

The image-capturing device 1810 includes one or more processors 1811, one or more I/O interfaces 1812, storage 1813, and an image-capturing assembly 1814, and the image-capturing assembly 1814 includes one or more image sensors, one or more lenses, and an aperture. The hardware components of the image-capturing device 1810 communicate by means of a bus.

The image-capturing device 1810 also includes an image-capturing-control module 1813A and a communication module 1813B. The image-capturing-control module 1813A instructions that, when executed, or circuits that, when activated, cause the image-capturing device 1810 to capture one or more images using the image-capturing assembly 1814. The communication module 1813B includes instructions that, when executed, or circuits that, when activated, cause the image-capturing device 1810 to communicate with the barcode-reading device 1800, for example to send one or more images to the barcode-reading device 1800.

Some embodiments use one or more functional units to implement the above-described devices, systems, and methods. The functional units may be implemented in only hardware (e.g., customized circuitry) or in a combination of software and hardware (e.g., a microprocessor that executes software).

The scope of the claims is not limited to the above-described embodiments and includes various modifications and equivalent arrangements. Also, as used herein, the conjunction "or" generally refers to an inclusive "or," though "or" may refer to an exclusive "or" if expressly indicated or if the context indicates that the "or" must be an exclusive "or."

What is claimed is:

1. A device comprising:
   one or more computer-readable media; and
   one or more processors that are coupled to the one or more computer-readable media and that are configured to cause the device to
   obtain an image, which includes a plurality of pixels,
   identify a label-candidate area in the image without identifying a barcode in the image, wherein the label-candidate area is smaller than the image,
   determine if the label-candidate area satisfies a condition without determining whether other areas in the image satisfy the condition,
   in response to determining that the label-candidate area does not satisfy the condition, inflate the label-candidate area, thereby generating an inflated label-candidate area,
   obtain a higher-resolution version of the inflated label-candidate area,
   and
   determine if the higher-resolution version of the inflated label-candidate area satisfies the condition.

2. The device of claim 1, wherein the condition is that the label-candidate area includes a readable barcode.

3. The device of claim 1, wherein the condition is that the label-candidate area includes a readable barcode that encodes a tracking number.

4. The device of claim 1, wherein the higher-resolution version of the inflated label-candidate area includes pixels that surround the label-candidate area but that are not included in the label-candidate area.

5. The device of claim 1, wherein the inflated label-candidate area includes pixels that are within a predetermined number of pixels of the label-candidate area.

6. The device of claim 1, wherein, to identify the label-candidate area in the image, the one or more processors are further configured to cause the device to identify the label-candidate area in the image based on an aspect ratio of the label-candidate area.

7. The device of claim 1, wherein, to obtain the image, the one or more processors are further configured to cause the device to
   generate the image from the higher-resolution version of the image.

8. The device of claim 1, wherein, to determine if the label-candidate area satisfies the condition without determining whether other areas in the image satisfy the condition, the one or more processors are further configured to cause the device to input only the label-candidate area to a barcode-reading function.

9. One or more computer-readable storage media storing instructions that, when executed by one or more computing devices, cause the one or more computing devices to perform operations comprising:
   obtaining a sequence of images, all of which includes a same label-candidate area;
   identifying the label-candidate area in the images in the sequence of images without identifying a barcode in the images in the sequence of images;
   searching for a readable barcode of interest in the label-candidate area in an image in the sequence of images without searching for a readable barcode of interest in other areas in the image; and
   in response to finding a readable barcode in the label-candidate area in the image, reading a value of the readable barcode of interest in the label-candidate area.

10. The one or more computer-readable storage media of claim 9,
    wherein the operations further comprise discarding the images in the sequence of images that follow the image in which the value of the readable barcode of interest was read without searching for the readable barcode of interest in the images in the sequence of images that follow the image in which the value of the readable barcode of interest was read.

11. The one or more computer-readable storage media of claim 9, wherein identifying the label-candidate area is based on one or more of a shape of the label-candidate area, a size of the label-candidate area, a position of the label-candidate area, a color of the label-candidate area, and an orientation of the label-candidate area.

12. The one or more computer-readable storage media of claim 9, wherein identifying the label-candidate area is based on an aspect ratio of the label-candidate area.

13. The one or more computer-readable storage media of claim 9, wherein the operations further comprise:
    creating a record for the label-candidate area; and
    adding respective values of any read barcodes in the label-candidate area, including the barcode of interest, to the record for the label-candidate area.

14. A method comprising:
    obtaining a captured image, which includes a plurality of pixels,
    generating a lower-resolution version of the captured image,
    identifying a label-candidate area in the lower-resolution version of the captured image, wherein the label-candidate area is smaller than the image,
    determining that the label-candidate area in the lower-resolution version of the captured image does not satisfy a condition,
    in response to determining that the label-candidate area in the lower-resolution version of the captured image does not satisfy the condition, identifying the label-candidate area in the captured image, and
    determining that the label-candidate area in the captured image satisfies the condition.

15. The method of claim 14, wherein the condition is that the label-candidate area includes a readable barcode.

16. The method of claim 15, further comprising:
    in response to determining that the label-candidate area in the captured image includes a readable barcode, reading and storing a value of the readable barcode.

17. The method of claim 14, wherein determining that the label-candidate area in the lower-resolution version of the captured image does not satisfy the condition is performed without determining whether any areas in the lower-resolution version of the captured image other than the label-candidate area satisfy the condition.

18. The method of claim 14, wherein identifying the label-candidate area in the lower-resolution version of the captured image is performed without identifying a barcode in the lower-resolution version of the captured image.

19. The method of claim 14, wherein determining that the label-candidate area in the captured image satisfies the condition includes inputting only the label-candidate area to a barcode-reading function.

* * * * *